US012689647B2

(12) United States Patent (10) Patent No.: US 12,689,647 B2
Sabarwal et al. (45) Date of Patent: Jul. 21, 2026

(54) MANAGING NETWORK CONTAGION

(71) Applicant: University of Kansas, Lawrence, KS (US)

(72) Inventors: Tarun Sabarwal, Lawrence, KS (US); John Francis Higgins, Olathe, KS (US)

(73) Assignee: University of Kansas, Lawrence, KS (US)

( * ) Notice: Subject to any disclaimer, the term of this patent is extended or adjusted under 35 U.S.C. 154(b) by 280 days.

(21) Appl. No.: 18/117,831

(22) Filed: Mar. 6, 2023

(65) Prior Publication Data

US 2023/0283630 A1 Sep. 7, 2023

Related U.S. Application Data

(60) Provisional application No. 63/317,418, filed on Mar. 7, 2022.

(51) Int. Cl.
*G06Q 10/40* (2026.01)
*H04L 9/40* (2022.01)

(52) U.S. Cl.
CPC ......... *H04L 63/1433* (2013.01); *G06Q 10/40* (2026.01)

(58) Field of Classification Search
CPC .......... H04L 63/1433; H04N 21/44226; G06Q 50/01
See application file for complete search history.

(56) References Cited

U.S. PATENT DOCUMENTS

2004/0249700 A1* 12/2004 Gross ................. G06Q 30/0202
705/7.33
2006/0112111 A1* 5/2006 Tseng ........................ G06N 5/01
707/E17.084
2008/0077574 A1* 3/2008 Gross ................ G06F 16/90324
707/999.005

(Continued)

OTHER PUBLICATIONS

Bartal, A. et al., "Local/Global contagion of viral/non-viral information: Analysis of contagion spread in online social networks," PLoS ONE 15(4): e0230811. https://doi.org/10.1371/journal.pone. 0230811, 22 pages.

(Continued)

*Primary Examiner* — Emmanuel L Moise
*Assistant Examiner* — Xiang Yu
(74) *Attorney, Agent, or Firm* — Ray Quinney & Nebeker P.C.; Paul N. Taylor

(57) ABSTRACT

The present disclosure relates to systems, methods, and computer-readable media for improving the detection, evaluation, and management of computer networks with regard to providing and managing the dispersion of communications. For example, in one or more implementations, a contagion management system can dynamically, efficiently, and quickly identify the extent to which information is expected to disperse in a network based on local and global factors, including virality. In various implementations, the contagion management system can utilize one or more spreading models to determine the potential expected network spread of network information and characteristics as well as can modify network connectivity settings to mitigate network spreading. In this manner, the contagion management system can effectively manage contagions of misinformation, or other characteristics, that spread throughout computer networks.

20 Claims, 13 Drawing Sheets

(56)         References Cited

U.S. PATENT DOCUMENTS

| | | | | |
|---|---|---|---|---|
| 2009/0204482 A1* | 8/2009 | Reshef | ................... | G06Q 30/02 |
| | | | | 705/1.1 |
| 2019/0026786 A1* | 1/2019 | Khoury | .............. | G06Q 30/0271 |
| 2022/0007380 A1* | 1/2022 | Ito | ........................ | H04W 72/12 |
| 2023/0230583 A1* | 7/2023 | Nguyen | ................ | G10L 15/083 |
| | | | | 704/275 |

OTHER PUBLICATIONS

Bramoullé, Y., et al. (2014): "Strategic Interaction and Networks," American Economic Review, 104 (3): 898-930.

Higgins, et al., "Control and spread of contagion in networks with global effects," Jan. 11, 2023 (41 pages).

Jackson, M. O., "Social and Economic Networks," Princeton University Press, Mar. 2008 (38 pages).

Jackson, M. O., et al., (2015): "Games on networks," Handbook of Game Theory with Economic Applications, vol. 4, 95-163.

Morris, S. (2010): "Contagion," The Review of Economic Studies, 67(1), 57-78.

Morris, Stephen, "Contagion," Cowles Foundation Paper No. 996, Cowles Foundation for Research in Economics, Yale University, New Haven Connecticut, 2000, (23 pages).

Mosleh, M. et al., "Globalization and the rise and fall of cognitive control," Nature Communications, https://doi.org/10.1038/s41467-020-16850-0, 10 pages.

Sarkar, K. et al., "Influencing Busy People in a Social Network," PLoS ONE 11(10): e0162014. doi: 10.1371/journal.pone.0162014, published Oct. 6, 2016, 31 pages.

Vosoughi, S., et al., (2018): "The spread of true and false news online," Science, 359(6380):1146-1151.

Wang, W., et al., "Modeling and maximizing influence diffusion in social networks for viral marketing," Applied Network Science, (2018) 3:6, https://doi.org/10.1007/s41109-018-0062-7, 26 pages.

* cited by examiner

100

200

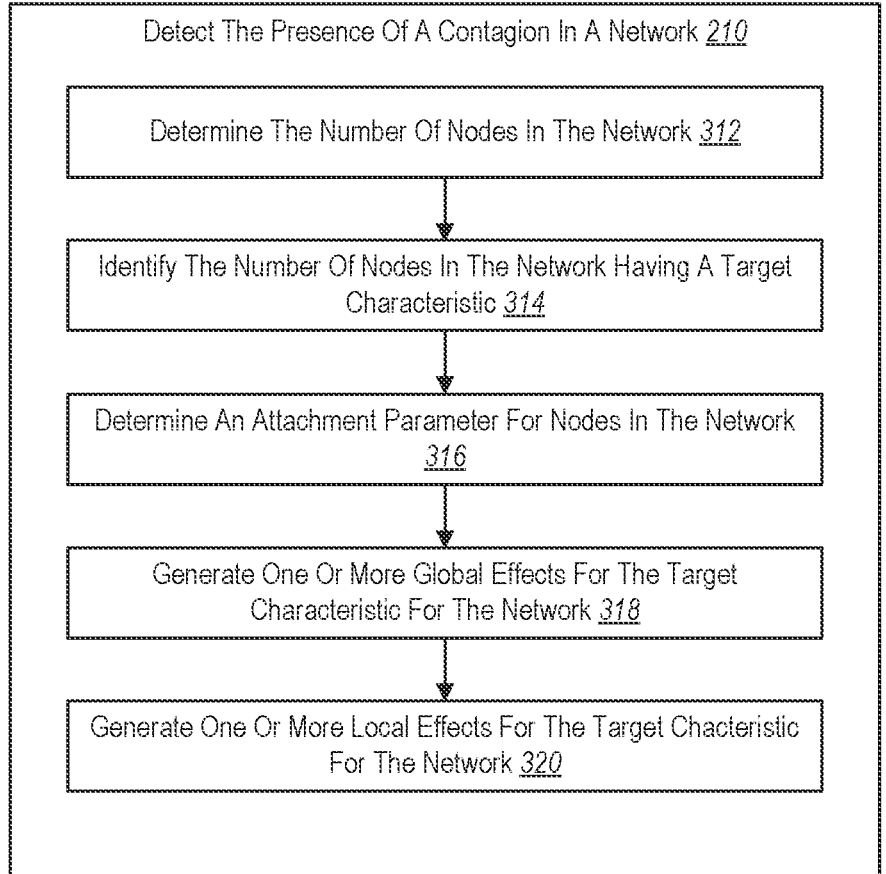

Detect The Presence Of A Contagion In A Network _210_

Determine The Number Of Nodes In The Network _312_

Identify The Number Of Nodes In The Network Having A Target Characteristic _314_

Determine An Attachment Parameter For Nodes In The Network _316_

Generate One Or More Global Effects For The Target Characteristic For The Network _318_

Generate One Or More Local Effects For The Target Chacteristic For The Network _320_

FIG. 3

Contagion Threshold With Local Effects Only

FIG. 7A

Contagion Threshold With Local And Global Effects
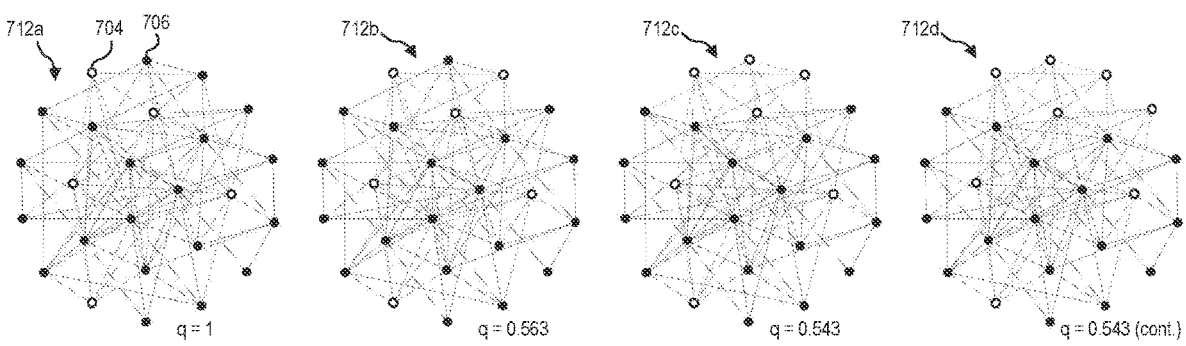
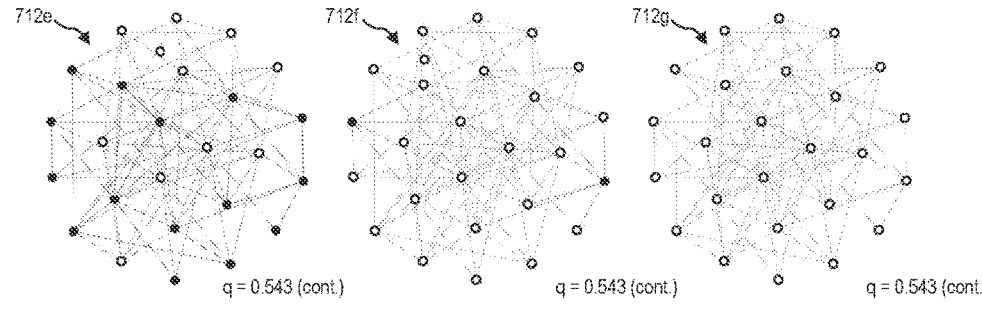
FIG. 7B

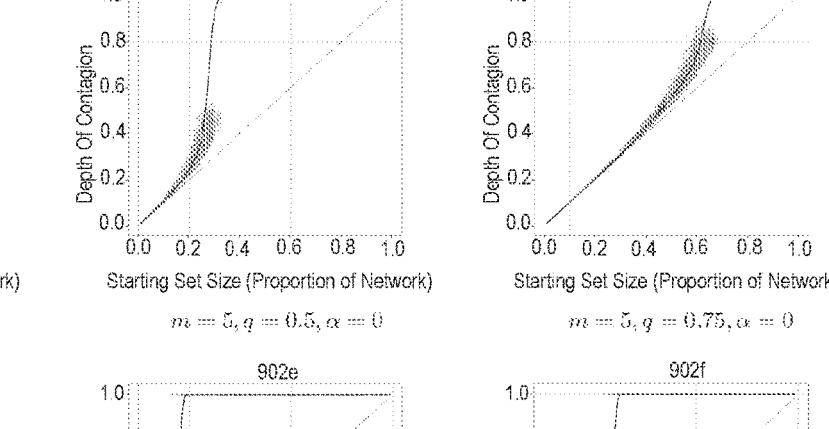
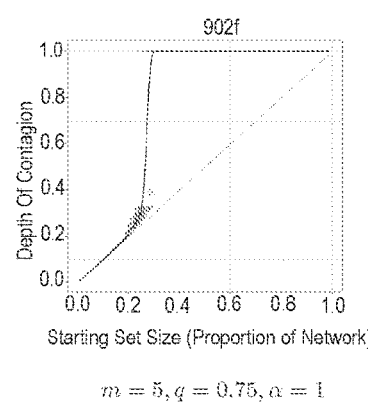
Depth Of Contagion For Scale-Free Networks With *m* = 5
902a
902b
902c
902d
902e
902f
FIG. 9A Depth of Contagion For Scale-Free Networks with $m = 20$
912a
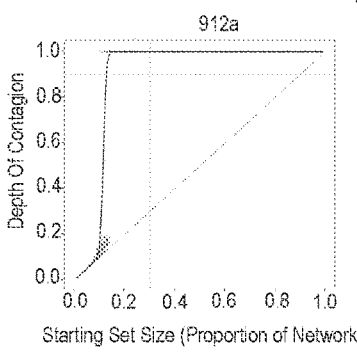
$m = 20, q = 0.25, \alpha = 0$
912b
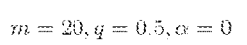
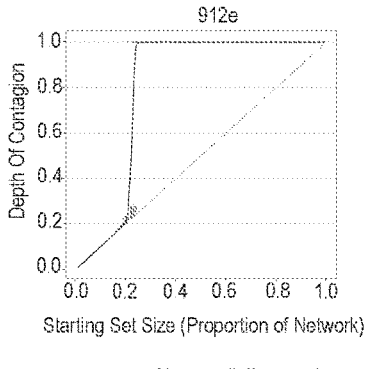
$m = 20, q = 0.5, \alpha = 0$
912c
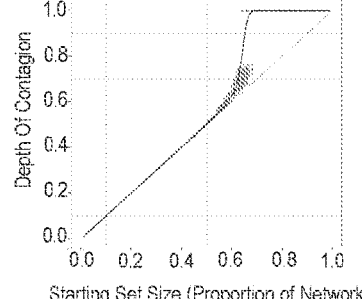
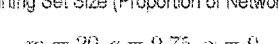
$m = 20, q = 0.75, \alpha = 0$
912d
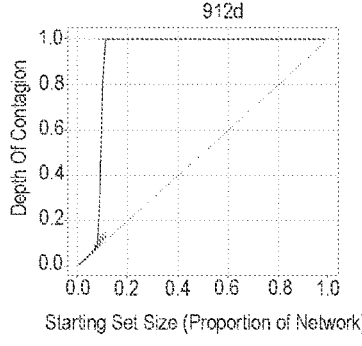
$m = 20, q = 0.25, \alpha = 1$
912e
$m = 20, q = 0.5, \alpha = 1$
912f
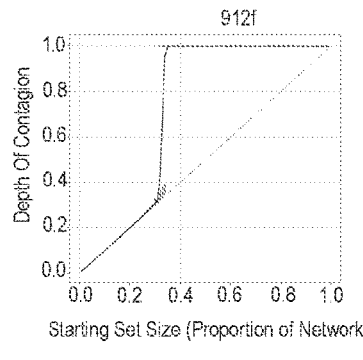
$m = 20, q = 0.75, \alpha = 1$
FIG. 9B

MANAGING NETWORK CONTAGION

CROSS REFERENCE TO RELATED APPLICATIONS

This application claims benefit and priority to Provisional Application No. 63/317,418, filed on Mar. 7, 2022, the entire contents of which is incorporated herein by reference.

BACKGROUND

Recent years have seen significant advancements in hardware and software platforms that implement computer networking systems. Indeed, because most computing devices today are connected to computing networks, computer networking systems continually strive to provide reliable services and secure features to connected devices and users. Despite many advances, existing computer networking systems continue to suffer from a number of technical drawbacks. In particular, many existing computer networking systems struggle with efficiency and accuracy when implementing networks that detect, anticipate, and manage the spread of accurate communications.

To elaborate, many existing computer networking systems, including several social networking systems, have networking frameworks that impede their ability to perform computing operations efficiently and accurately. Indeed, when communications are introduced to these existing systems, the setup and management of these existing systems cause misinformation to spread virally across network nodes.

Along with poor setup and management, many existing systems struggle to identify, assess, and manage the spread of misinformation. As one reason, existing systems employ current approaches that are impractical and inefficient due to their complexity. For instance, some existing systems use approaches that are complex and limited to very small networks. Thus, as the number of nodes in the network grows, these systems fail in terms of both operation and accuracy. To illustrate, given a network of 1,000 nodes where 100 of the nodes include a given attribute, even checking each subset of nodes not having the given attribute at a speed of one nanosecond, it would require roughly $2.68 \times 10^{254}$ years for such a process to complete one run let alone multiple runs. This further precludes the ability to change various variables, such as starting set size, spreading factors, network connectivity, etc. Indeed, such computations are infeasible with current computing capabilities as network sizes increase.

Moreover, many existing systems inaccurately evaluate how communications spread within a network. As a first example, several existing systems enforce strict conditions, such as network continuity, convexity, concavity, and differentiability. As another example, some existing systems do not allow for heterogeneity in local effects. Additionally, many existing systems fail to account for global effects both in and out of the network. As a result, many existing systems inaccurate manage communication spread with their networks.

These and other problems exist in current computer networking systems with regard to providing and managing the spread of accurate communications.

BRIEF SUMMARY

Embodiments of the present disclosure provide benefits and/or solve one or more of the foregoing or other problems in the art with systems, non-transitory computer-readable media, and methods that facilitate the improved detection, evaluation, and management of computer networks with regard to facilitating and managing the dispersion of communications. For example, the disclosed systems can dynamically, efficiently, and quickly identify the extent to which information will disperse in a network given various local and global factors, including virality. Indeed, the disclosed systems can utilize one or more spreading models to determine potential negative fluctuations and modify network connectivity settings to curtail network spreading. In this manner, the disclosed systems can effectively manage contagions of misinformation that spread throughout computer networks, such as social networking systems.

To illustrate, in one or more implementations, the disclosed systems can identify a first number of nodes having a target characteristic in a network where the network includes multiple nodes. In addition, the disclosed systems can generate a global effect factor based on the target characteristic and the network. Further, the disclosed systems can determine that a second number of nodes are estimated to have the target characteristic at an upcoming period based on the first number of nodes, a network resistance parameter, and the global effect factor. Moreover, the disclosed systems can modify network connectivity settings to reduce the total number of nodes in the network from having the target characteristic by the upcoming period based on determining that the second number of nodes satisfies a network threshold.

Additional features and advantages of one or more embodiments of the present disclosure are outlined in the following description.

BRIEF DESCRIPTION OF THE DRAWINGS

The detailed description provides one or more embodiments with additional specificity and detail through the use of the accompanying drawings, as briefly described below.

FIG. 3 illustrates detecting the presence of a contagion in a network in accordance with one or more implementations.

FIGS. 7A-7B illustrate examples of a contagion spreading in a network over time based on local and global effects in accordance with one or more implementations.

FIGS. 9A-9B illustrate examples of contagion depth for scale-free networks in accordance with one or more implementations.

DETAILED DESCRIPTION

Figure 1:
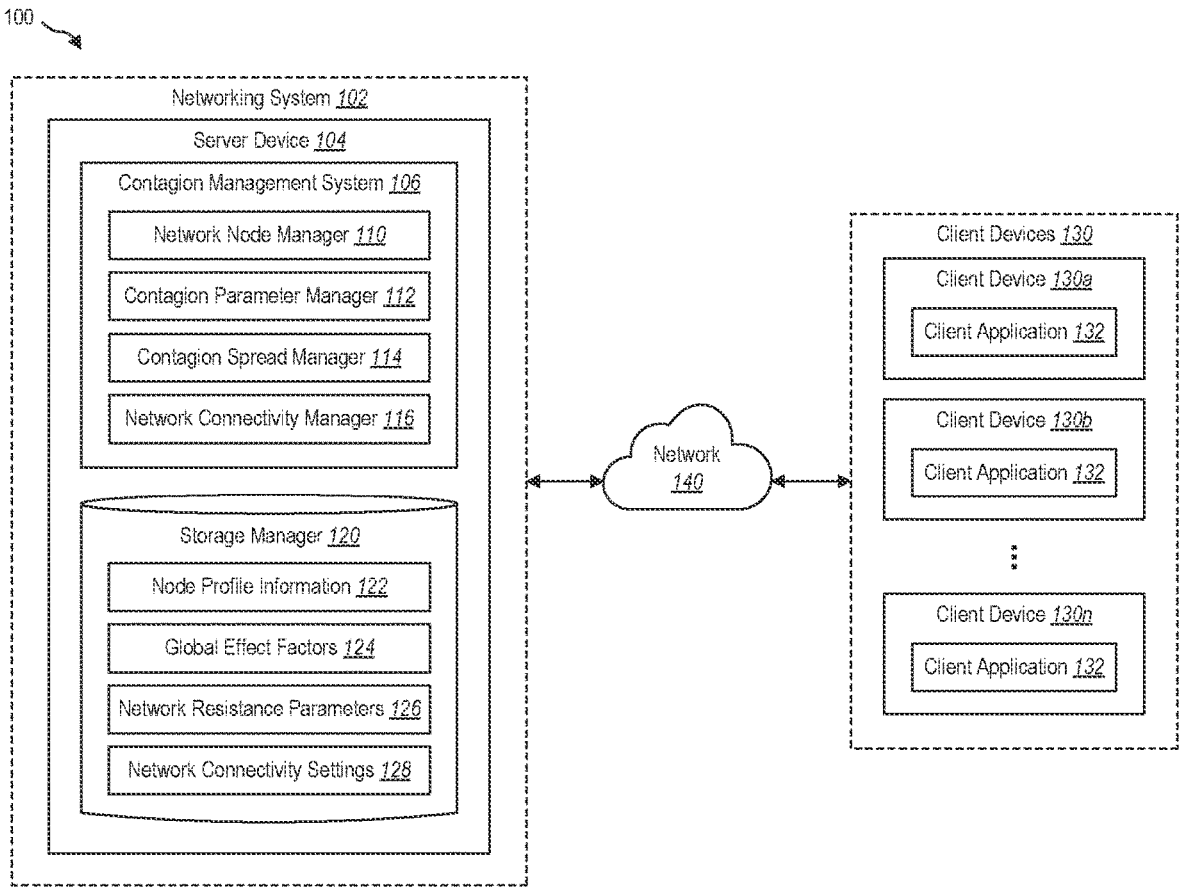
FIG. 1 illustrates a digital medium system environment including a contagion management system in accordance with one or more implementations.

The present disclosure generally relates to communication management in computer networking systems and more specifically to the improved detection, evaluation, and management of computer networks with regard to providing and managing network communication dispersion. For example, in one or more implementations, a contagion management system can dynamically, efficiently, and quickly identify the extent to which information is expected to disperse in a network based on local and global factors, including virality. In various implementations, the contagion management system can utilize one or more spreading models to determine the potential expected network spread of communications and can modify network connectivity settings to curtail the network spreading. In this manner, the contagion management system can effectively manage contagions of misinformation that spread throughout computer networks, such as social networking systems.

To illustrate, in various implementations, the contagion management system can identify a first number of nodes having a target characteristic in a network where the network includes multiple nodes. In addition, the contagion management system can generate a global effect factor based on the target characteristic and the network. Further, the contagion management system can determine that a second number of nodes in the network are estimated to have the target characteristic at an upcoming period based on the first number of nodes, a network resistance parameter, and the global effect factor. Moreover, the contagion management system can modify network connectivity settings to reduce the total number of nodes in the network from having the target characteristic by the upcoming period based on determining that the second number of nodes satisfies a network threshold at or by the upcoming period.

As discussed in further detail below, the present disclosure includes several practical applications having features and functionalities described herein that provide benefits and/or solve the problems mentioned above. For example, in one or more implementations, the contagion management system evaluates communications in a computer network to identify potential communication contagions and, in response, the contagion management system modifies the framework of the network by changing network connectivity settings and improving network resilience to reduce network spread of the contagion within the network. In addition, the contagion management system more accurately determines contagion spread (than existing systems) by identifying and incorporating global effects within and with external to the network.

To illustrate, the contagion management system can utilize one or more spreading models to determine potential negative (or positive) fluctuations and modify network connectivity settings to mitigate (or support) network spreading. For example, in one or more implementations, the contagion management system utilizes a depth spreading model to determine the outcome of a current or anticipated contagion within a network. In some instances, the contagion management system utilizes the depth spreading model to determine the amount of network spreading based on an initial number of nodes that have a target characteristic (e.g., false communication, misinformation, and/or other contagions) and a network resistance parameter.

As another example, the contagion management system utilizes a full-network spreading model to estimate contagion spread in a network. For instance, the contagion management system can utilize the full-network spreading model to determine one or more target network resistance parameters needed to spread a target characteristic throughout the network based on an initial number of nodes having the target characteristic and a global effect factor.

Unlike existing systems, the depth spreading model and the full-network spreading model both achieve accurate calculations for computing networks, including large networks, while easily running on modem-day computing devices. Thus, while existing systems perform operations exponentially, these models described herein perform operations more linearly. Indeed, the upper bound of these models is based on the number of total nodes in the network minus the initial number of nodes having the target characteristic. Often, the number of operations is significantly less as spreading commonly occurs to multiple nodes at each time period.

Additionally, in various implementations, the depth spreading model reuses results when iterating through operations (e.g., bootstrapping). In these implementations, the contagion management system bootstraps from the results from the end of a run from the depth spreading model to the start of the next run. The results are then provided to the full-network spreading model, which further processes the data to determine a contagion threshold and/or network resilience parameter. Indeed, the efficiency gain is an important step in providing a greatly improved model used to determine one or more contagion thresholds using the full-network spreading model.

As another advantage, the contagion management system enables the modification of network characteristics when determining network spread and contagion thresholds. For example, in various implementations, the contagion management system facilitates the modification of network characteristics such as starting set size, network resilience, and network connectivity. In addition, the contagion management system removes restrictions related to continuity, convexity, concavity, differentiability, etc., as well as allows for heterogeneity in global effects for different nodes.

Additionally, the contagion management system provides increased accuracy by intelligently incorporating global effects in its models, such as the viral nature of communications. In various implementations, the contagion management system makes the global effects transparent and tractable within the models while still allowing for natural interactions with local effects.

As illustrated by the above discussion, the present disclosure utilizes a variety of terms to describe the features and advantages of the digital media clip system. Additional detail is now provided regarding the meanings of some of these terms. For instance, a "computer network" refers to a collection of electronically connected nodes. In some implementations, a computer network is part of, or makes up, a networking system such as a social networking system, or a social media system. In alternative implementations, a computer network is another collection of connected nodes. As a note, in many instances, a computer network is referred simply as "a network" or "the network" meaning a network of nodes or computing devices. However, in some instances, the term "network" more generally refers to one or more data links that enable the transport of electronic data between electronic devices.

As noted, a computer network (or network) may include nodes and/or computing devices. In various implementations, the computing devices are associated with user accounts having user profiles. For example, a user profile can include demographic, social, economic, and/or other information about a user account. In addition, a user profile of a social networking system can include posts shared by a user account and/or characteristics associated with a user account.

The term "target characteristic" refers to a particular characteristic associated with a user account. In some instances, the target characteristic is based on content within a post (e.g., information or misinformation shared in a post). In some instances, the target characteristic is based on an attribute associated with the user account (e.g., a reaction, an indication of a preference, associated with a group, etc.) In some implementations, a target characteristic refers to a condition associated with a user account (e.g., banned, blocked, probation, under observation, etc.). In some implementations, a target characteristic refers to a condition of a computing device (e.g., a computing device houses a spreadable virus). In various implementations, a node having the target characteristic is referred to in a negative light, such as being infected, being contagious, or having a contagion. However, in alternative implementations, a node having the target characteristic is referred to in a positive light due to the target characteristic being a desirable feature, trait, characteristic, and/or attribute (e.g., verified information, a software update, a humorous video, etc.).

The term "global effect factor" (and sometimes "global effect") refers to the virality of a node, the network, and/or the target characteristic. For instance, the global effect factor can indicate the probability or likelihood that a given node in the network, which currently does not have the target characteristic in one time period, will have the target characteristic in the next (or a future) time period. In various implementations, the contagion management system determines the probability based on the influence of non-neighbor nodes, non-directly connected, and/or external influences.

In various implementations, a global effect factor provides an indication of how non-directly connected nodes having the target characteristic will affect and/or influence a given non-infected node. In some implementations, the global effect factor for a given node comprises a fraction of nodes in the network, excluding the given node and neighbors of the given node, that have the target characteristic. The global effect factor can refer to one, more, all, or a subset of nodes in a network (e.g., all nodes with or without the target characteristic). In certain implementations, the global effect factor is represented as a spreading factor for nodes not yet having the target characteristic.

The term "network resistance parameter" refers to an indication of network resilience against the spread of communications (or the spread of the. target characteristic) within a network. In some implementations, the network resistance parameter is based on the architecture of a network, such as an attachment parameter (e.g., the number of nodes to which a given node is directly connected or the average number of direct and/or secondary connections for nodes in the network). In various implementations, the network resistance parameter is based on network connectivity settings.

The term "network connectivity settings" refers to settings, policies, preferences, and/or rules of a network with regard to node communications. For example, a network connectivity setting can indicate which nodes can communicate with non-connected or distantly connected nodes (e.g., nodes beyond two, three, or more hops). As another example, a network connectivity setting may limit which types of communications can be shared with other nodes and/or whether particular content is restricted. Additional examples of network connectivity settings are provided below.

The term "network threshold" refers to a set number or amount of nodes in a network that include the target characteristic. In some implementations, a network threshold is a percentage of a network (e.g., 25%, 40%, 75%, etc.). In many implementations, a network threshold includes most or all nodes in a network. In various implementations, a network threshold is associated with nodes having (or not having) the target characteristic (e.g., nodes infection with a contagion).

Additional detail regarding the contagion management system is now provided with reference to the figures portraying example implementations. For example, FIG. 1 illustrates a schematic diagram of an environment 100 (i.e., a digital medium system environment) for implementing a network system 102. The network system 102 can include any number of computing devices, such as a server device 104 that implements a contagion management system 106. In addition, the environment 100 includes client devices 130 that communicate with the network system 102 via a network 140. Additional detail regarding these computing devices and networks is provided below in connection with FIG. 11.

In various implementations, the network system 102 includes multiple computing devices, such as multiple server devices, storage devices, load balancers, and/or other network-based component devices. In some implementations, the network system 102 implements a social networking system or a social media system having user accounts. In one or more implementations, the network system 102 includes provides other services and features for connecting computing devices (e.g., nodes) and/or user accounts together.

As shown, the contagion management system 106 includes various components including a network node manager 110, a contagion parameter manager 112, a contagion spread manager 114, a network connectivity manager 116, and a storage manager 120. As also shown, the storage manager 120 includes node profile information 122, global effect factors 124, network resistance parameters 126, and network connectivity settings 128. In some implementations, one or more of the components are virtual. Additionally, in various implementations, one or more of the components are located on a separate device from other components of the contagion management system 106. Additionally, in one or more implementations, the contagion management system 106 includes additional or fewer components.

In some implementations, the network node manager 110 can access, add, modify, store, analyze, remove, or otherwise manage network nodes. In various implementations, network nodes include one or more of the client devices 130 connected to the network system 102. In one or more implementations, the network node manager 110 manages user accounts and/or account profiles associated with nodes, including node profile information 122. For example, the network node manager 110 facilitates social networking posts that include content (e.g., a target characteristic) provided by a user account and shared with other user accounts. In example implementations, the network node manager 110 maintains a listing of which nodes are connected (e.g., directly or secondarily) to other nodes within the network system 102.

In one or more implementations, the contagion parameter manager 112 facilitates creating, identifying, modifying, calculating, and/or applying contagion parameters. Some examples of contagion parameters include local effect factors, global effect factors 124, network resistance parameters 126, network connectivity settings 128, contagion thresholds, network thresholds, initial or starting node sets, and/or other network parameters.

Based on the contagion parameters, the contagion management system 106 can effectuate change to the network system 102. As shown, the contagion management system 106 includes the network connectivity manager 116. In various implementations, the network connectivity manager 116 can access, modify, add, enforce, and/or remove the network connectivity settings 128 to reduce, halt, or reverse the network spread of a detected contagion. In alternative implementations, the network connectivity manager 116 can maintain or modify the network connectivity settings 128 to support or perpetuate network spread (e.g., in the case of a positive contagion or target characteristic).

As mentioned, the environment 100 (i.e., the digital medium system environment) also includes the client devices 130, which includes a first client device 130a, a second client device 130b, and an nth client device 130n. As shown, each of the client devices 130 includes a client application 132. In various implementations, the client application 132 facilitates communication with the network system 102. To illustrate, for cases where the network system 102 is a social networking system, the client application 132 facilitates access to the social networking system to access, add, create, modify, view, share, and/or remove content. For example, the first client device 130a shares content having the target characteristic and the second client device 130b reshares, likes, comments, or otherwise reacts to the target characteristic in a manner that propagates the spread of the target characteristic within the network system 102.

Figure 2:
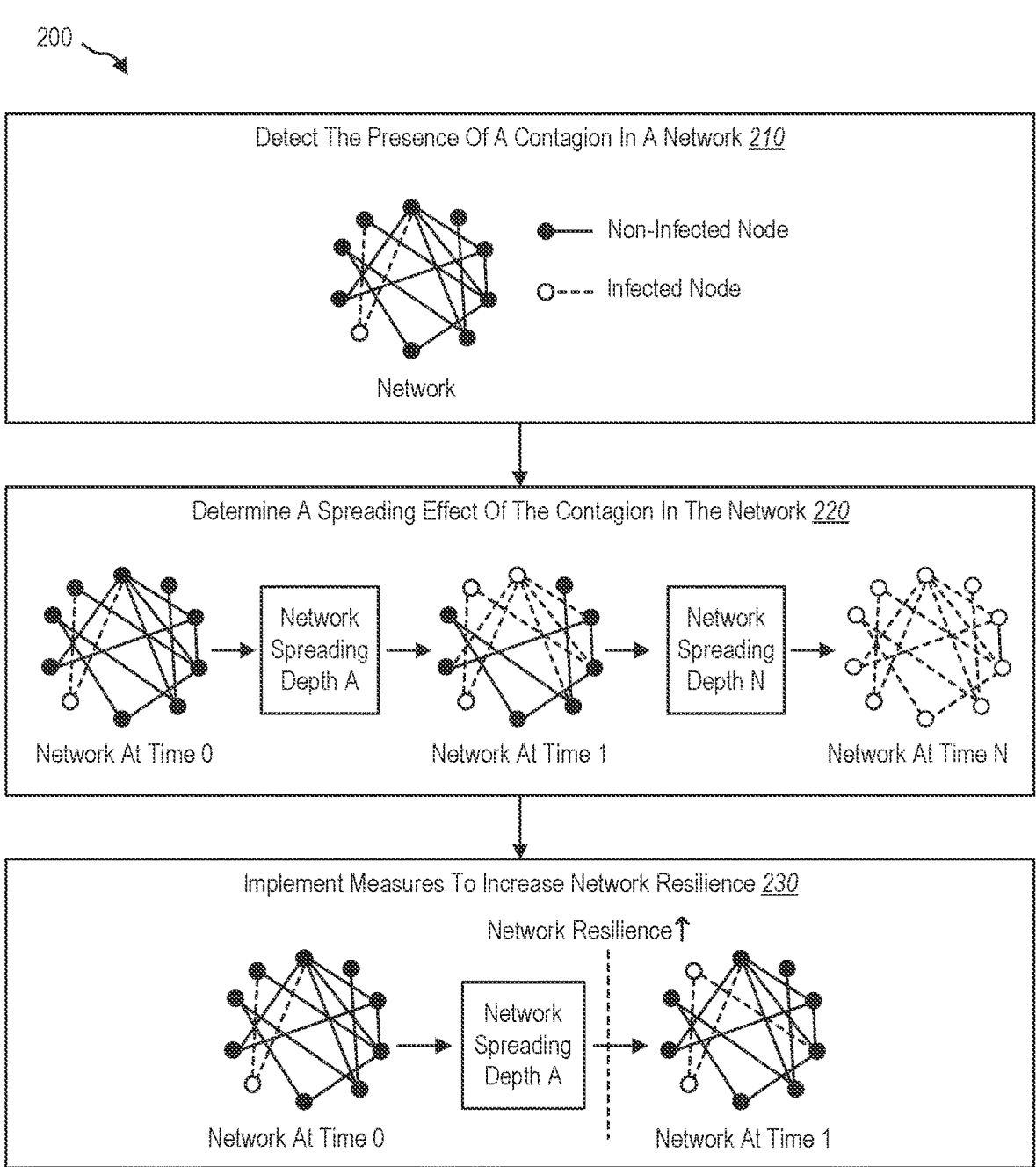
FIG. 2 illustrates an overview of reducing the network spread of a contagion based on increasing network resilience in accordance with one or more implementations.

In response, the contagion management system 106 can detect the spread of the target characteristic and implement network connectivity setting changes if needed. To further illustrate, FIG. 2 provides an overview of reducing the network spread of a contagion based on increasing network resilience in accordance with one or more implementations. As shown, FIG. 2 includes a series of acts 200 performed by the contagion management system 106.

As illustrated, the series of acts 200 includes an act 210 of detecting the presence of a contagion in a network. For instance, in various implementations, the contagion management system 106 determines the presence of a target characteristic in connection with various nodes (e.g., user accounts and/or client devices). In some implementations, the contagion management system 106 determines if the target characteristic is positive or negative. For example, the contagion management system 106 determines if the target characteristic includes misinformation or malware. In some implementations, the contagion management system 106 determines whether the target characteristic has infected a node, either virtually or physically. Additional detail regarding detecting the presence of a contagion in a network is provided below in connection with FIG. 3.

As shown, the series of acts 200 includes an act 220 of determining a spreading effect of the contagion in the network. For instance, in some implementations, the contagion management system 106 determines the likelihood of the target characteristic spreading to other nodes in the networking system, either through local effects or global effects. For example, suppose a first node (uninfected) is only connected to a second node (infected) at time 0 and the first node is then infected at time 1. Here, the first node likely becomes infected due to the local effects of having only one connection and the one connection was infected. As another example, suppose the first node uninfected is connected to one or more other nodes, but no infected nodes, at time 0 but becomes infected at time 1. Here the first node likely became infected based on global spreading effects due to cross-network influences and/or external influences (as no neighbor nodes were infected at time 0).

In addition, the contagion management system 106 can determine one or more network spreading depths of the target characteristic at different times given the number of nodes in a starting set, as shown. In some instances, the contagion management system 106 forecasts that the contagion spreads to the whole networking system, as shown in connection with the act 220 at time N. In other instances, the contagion management system 106 forecasts that the contagion spreads to only a portion (e.g., percentage or amount) of the network. Additional detail regarding determining a spreading effect of the contagion in the network is provided below in connection with FIG. 4.

As also illustrated, the series of acts 200 includes an act 230 of implementing measures to increase network resilience in the networking system. For instance, in one or more implementations, the contagion management system 106 modifies one or more network connectivity settings to reduce the spread of the target characteristic within the networking system. Additional detail regarding implementing measures to increase network resilience in the networking system is provided below in connection with FIG. 5.

As mentioned above, FIG. 3 provides more detail regarding detecting a contagion in a network. In particular, FIG. 3 illustrates and expands upon the act 210 from FIG. 2 of detecting the presence of a contagion in a network in accordance with one or more implementations. As shown, the act 210 includes the contagion management system 106 performing various sub-acts.

To illustrate, the act 210 includes a sub-act 312 of determining the number of nodes in the network. In a number of implementations, the contagion management system 106 identifies the total number of nodes in the network. For example, if the network, is a social networking system, the contagion management system 106 identifies the number of registered user accounts. In some implementations, the contagion management system 106 determines the number of active user accounts or nodes. In various implementations, the contagion management system 106 determines the number of user accounts or nodes having a minimum number of connections with other nodes (e.g., one, two, or more connections).

As shown, the act 210 also includes a sub-act 314 of identifying the number of nodes in the network having a target characteristic. For instance, in one or more implementations, the contagion management system 106 analyzes each of the nodes to determine which nodes include a target characteristic. For example, the contagion management system 106 scans nodes and/or the contents of nodes to detect the presence of the target characteristic. In example implementations, the contagion management system 106 determines a subset of nodes having the target characteristic and a subset of nodes not having the target characteristic. In various implementations, the contagion management system 106 identifies nodes having the target characteristic as infected nodes and/or contagions nodes. In alternative implementations, the contagion management system 106 identifies these nodes as distilled, verified, trusted, sanitized, immunized, or another positive attribute.

In one or more implementations, the target characteristic is content shared by a user account of a social networking system. For example, the target characteristic is information or misinformation within a social media post. In some implementations, the target characteristic is an affiliation with a group, club, or association. In various implementations, the target characteristic is a link, file, or content itself. In these and other implementations, the target characteristic is stored within a user profile associated with a user account, and the contagion management system 106 can search user accounts and/or user profiles within a social graph to determine if a node includes the target characteristic. Stated differently, the contagion management system 106 can analyze user account and/or social node data to identify the target characteristic in connection with a user account/node.

As shown, the act 210 includes a sub-act 316 of determining an attachment parameter for nodes in the network. In one or more implementations, an attachment parameter includes a number of nodes to which a node is connected. For example, each node in a network can include an attachment parameter that denotes the number of neighbor nodes with which the node is directly connected. In some implementations, an attachment parameter refers to the mean (e.g., average), medium (e.g., middle), or mode (e.g., most often) number of connections for nodes in the network. In some implementations, the attachment parameter is the minimum number of connections that a majority of nodes in the network have. Examples of attachment parameters include 5, 10, and 20 connections for a large number of nodes in the network.

In addition, FIG. 3 shows the act 210 includes a sub-act 318 of generating one or more global effects for the target characteristic of the network. For instance, in one or more implementations, the contagion management system 106 determines one or more parameters and factors associated with global effects for nodes and/or the network, such as a spreading factor. In some instances, the global effects correspond to the influence that nodes having the target characteristic (e.g., infected nodes) have on other nodes in the network, and in particular, nodes in the network that are not directly connected to an infected node (e.g., (non-neighbor nodes). In various implementations, global effects can introduce and appropriately measure the viral nature of the target characteristic and its potential to spread through the network at different time periods.

To illustrate, in some implementations, the contagion management system 106 determines a global effect factor for a non-infected node in the network (e.g., nodes in the network that do not have the target characteristic) by determining the likelihood (e.g., a spreading factor) of the node acquiring the target characteristic in the next period of time based on non-directly connected nodes. Further, in some implementations, the contagion management system 106 generates a global effect factor for a given node by determining the fraction of nodes in the network that have the target characteristic, the fraction excluding the given node itself and neighbor nodes of the given node. In some instances, neighbor nodes include directly connected nodes. In other instances, neighbor nodes include nodes connected within a predetermined number of network hops (e.g., one, two, or three hops).

In some implementations, the contagion management system 106 aggregates, averages, and/or otherwise combines the global effects for multiple nodes to determine a global effect factor for the network. For example, the contagion management system 106 combines global effect factors determined for each non-infected node (or a sample group of non-infected nodes) to determine the global effect for the network, which indicates the likelihood that non-infected nodes in the network will be infected (e.g., acquire the target characteristic) from non-neighboring nodes (e.g., non-directly connected nodes).

In additional implementations, global effects include addition factors external to the network. For example, the contagion management system 106 determines one or more global effect factors from news feeds, information services, or other external networks (e.g., other social networks).

In various implementations, global effects are included as an additive component to the likelihood that a node with change from not having the target characteristic to having the target characteristic. Indeed, global effects provide the contagion management system 106 a transparent and tractable measure while still allowing for natural interactions with local effects. In various implementations, global effects flexibly increase over time, albeit weakly at times. Further, in many instances, the contagion management system 106 is not limited by global effects. For example, the contagion management system 106 imposes no restricted based on continuity, convexity, concavity, or differentiability. Moreover, the contagion management system 106 can allow for heterogeneity in global effects for different nodes.

As shown, the act 210 also includes a sub-act 320 of generating one or more local effects for the target characteristic of the network. Similar to global effects, local effects can include parameters and factors that measure the spreading of the target characteristic from infected nodes. However, while global effects correspond to non-neighbor, indirect spreading, local effects correspond to spreading from neighbor nodes, such as directly connected nodes. In some implementations, local effects can include a spreading factor of nodes connected within one, two, three, or more hops from a node (e.g., direct neighbors or near neighbors). In various implementations, the contagion management system 106 applies heterogeneity in local effects (e.g., different weights are determined for different neighbors of a node, asymmetric weights for different nodes, and unidirectional links between nodes). Additional detail regarding global and local effects is provided below in the section entitled Example Network Spreading Algorithms.

Figure 4:
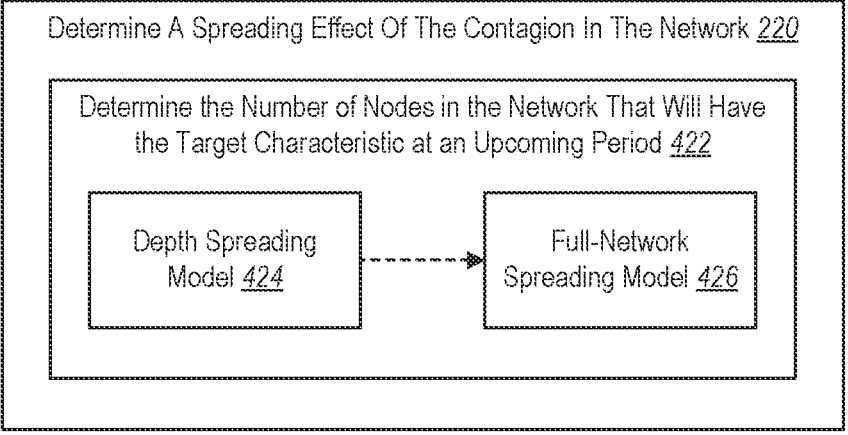
FIG. 4 illustrates determining a spreading effect of the contagion in the network in accordance with one or more implementations.

As mentioned above, FIG. 4 provides additional detail regarding the spreading of a contagion (e.g., the target characteristic) in a network in accordance with one or more implementations. For instance, FIG. 4 describes how rapidly and to what extent a contagion (e.g., the target characteristic) will spread throughout the network. In particular, FIG. 4 illustrates and expands upon the act 220 from FIG. 2 of determining a spreading effect of the contagion in the network.

As shown, the act 220 includes the contagion management system 106 performing a sub-act 422 of determining the number of nodes in the network that will have the target characteristic at an upcoming time period. For example, in various implementations, the contagion management system 106 determines whether the target characteristic will spread to the entire network, and if not, how far the contagion will spread given one or more network resistance parameters. Further, the contagion management system 106 can determine how many periods it takes to spread to an equilibrium state.

In some implementations, the contagion management system 106 determines an amount of network spread based on the number of nodes in the network, the initial number of infected nodes, a network resistance parameter, and a global effect factor for the target characteristic. In various implementations, the contagion management system 106 utilizes a depth spreading model 424 and/or a full-network spreading model 426 to determine the spreading effect of a contagion within the network.

To elaborate, in one or more implementations, the spreading model 424 determines an amount of network spreading based on the first number of nodes that have the target characteristic and a given network resistance parameter. For instance, given an initial set of nodes having the target characteristic compared to the total number of nodes and network resistance parameter, the contagion management system 106 utilizes the spreading model 424 to determine how deep the contagion will spread into the network and after how many time periods.

To illustrate by way of an example, the contagion management system 106 utilizes the spreading model 424 to determine that the target characteristic will spread to 40% of the network within five iterations at the current network resistance parameter settings before reaching an equilibrium. In another example, the contagion management system 106 utilizes the spreading model 424 to determine that the target characteristic will spread to the whole network within 8 iterations given the current network resistance parameter.

In various implementations, the spreading model 424 utilizes both local and global effects in determining whether an uninfected node will become infected in a subsequent time period (e.g., an upcoming time). Further, as noted above, the contagion management system 106 can iteratively use the spreading model 424 until an equilibrium is reached (e.g., no more nodes will change in the next time period based on local or global effects). Indeed, the spreading model 424 can provide an indication of the time period at which the target characteristic will spread within the network to its deepest depth.

In some implementations, the contagion management system 106 determines a current network resistance parameter of the network based on the one or more network connectivity settings of the network. For instance, given the number of nodes currently having the target characteristic, local and global effect factors for each node, and the size of the network, the contagion management system 106 can utilize the spreading model 424 to determine 1) whether the network will become fully infected and 2) at what point is full-network contagion no longer preventable. If the network reaches equilibrium before spreading to the whole network, the contagion management system 106 can utilize the spreading model 424 to determine 3) how deep the contagion will spread at the current network resistance parameter values and 4) how long that will take. As noted above, the contagion management system 106 can perform these operations with current computing devices where the number of operations is limited to the total number of nodes in the network per iteration (at most), and where the number of operations decreases each iteration as the contagion spreads (e.g., only non-infected nodes are considered in each iteration).

Detailed examples of the contagion management system 106 utilizing the spreading model 424 are provided below in the Example Network Spreading Algorithms section. In particular, in many implementations, the contagion management system 106 utilizes the spreading model 424 to implement Algorithm 1, as provided below.

As mentioned above, in some implementations, the contagion management system 106 can determine that the contagion will meet an equilibrium at a network depth less than the full network (e.g., 40% of the nodes infected). In these implementations, the contagion management system 106 can utilize the full-network spreading model 426 to determine a network resistance parameter needed to spread the contagion to the full network. In many implementations, the full-network spreading model 426 determines the lowest network resistance parameter (e.g., a target network resistance parameter) needed to spread the target characteristic to all of the nodes on the network.

In various implementations, the full-network spreading model 426 determines the network resistance parameter based on an initial number of nodes that have the target characteristic and the global effect factor for the target characteristic. For example, the contagion management system 106 provides these parameters to the full-network spreading model 426, which outputs the next lowest network resistance parameter (e.g., q) needed to keep expanding the target characteristic to non-infected nodes.

To elaborate, the full-network spreading model 426 can interactively lower the value of the network resistance parameter until a network resistance parameter is determined that will result in a full network contagion. In this manner, the contagion management system 106 can determine the minimum value for the network resistance parameter as well as how the amount (e.g., depth) of network contagion spread will reduce as the network resistance parameter is increased. Indeed, in some implementations, the contagion management system 106 utilizes the full-network spreading model 426 to determine the optimal value of the network resistance parameter to minimize network contagion spread given the costs to raise the network resistance parameter and/or change network connectivity settings to reduce global effects within the network.

Detailed examples of the contagion management system 106 utilizing the full-network spreading model 426 are provided below in the Example Network Spreading Algorithms section. In particular, in many implementations, the contagion management system 106 utilizes the full-network spreading model 426 to implement Algorithm 2, as provided below.

As mentioned above, the contagion management system 106 can utilize the spreading model 424 in connection with the full-network spreading model 426. For example, in one or more implementations, the contagion management system 106 nests the spreading model 424 within the full-network spreading model 426. For example, in these implementations, the contagion management system 106 utilizes the full-network spreading model 426 to determine the next lowest network resistance parameter and then feeds it into the full-network spreading model 426 to determine the extent (e.g., depth) the contagion will spread within the network. If the target characteristic spreads to less than the full network, the contagion management system 106 utilizes the full-network spreading model 426 to determine the next lowest network resistance parameter and the contagion management system 106 repeats the process.

Detailed examples of the contagion management system 106 utilizing the spreading model 424 in connection with the full-network spreading model 426 are provided below in the Example Network Spreading Algorithms section. In particular, in many implementations, the contagion management system 106 utilizes the full-network spreading model 426 nested within the full-network spreading model 426 to implement Algorithm 3, as provided below (e.g., Algorithm 1 nested within Algorithm 2). Visual examples and results are also provided below in connection with FIGS. 7A-7B, 8, and 9A-9B.

Figure 5:
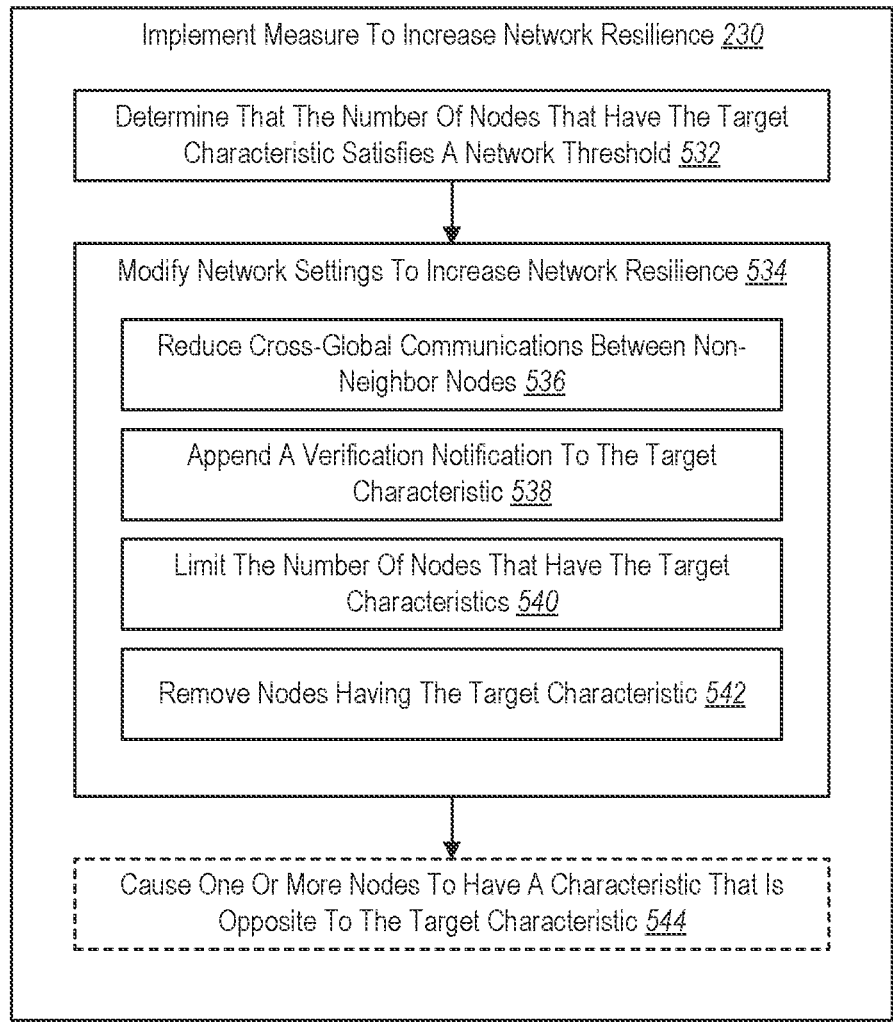
FIG. 5 illustrates implementing measures to increase network resilience in a network system in accordance with one or more implementations.

As mentioned above, FIG. 5 provides additional detail regarding network resilience factors. In particular, FIG. 5 illustrates implementing measures to increase network resilience in the networking system in accordance with one or more implementations. In particular, FIG. 5 illustrates and expands upon the act 230 from FIG. 2 of the contagion management system 106 implementing measures to increase network resilience in the networking system.

As shown, the act 230 includes a sub-act 532 of determining that the number of nodes that have the target characteristic satisfies a network threshold. For instance, upon detecting the depth of network spread at the current and upcoming time periods, the contagion management system 106 can compare the network spread depth (e.g., number of infected nodes) to a network threshold. In some implementations, the network threshold is a contagion tipping point, meaning the portion of the network that, if reached, will cause the contagion to spread throughout the entire network. For example, in an example, network, if the target characteristic reaches 45% of nodes, the target characteristic will inherently spread to the rest of the nodes.

As an illustrative example, given a network threshold of 35%, the contagion management system 106 determines if the current contagion amount is greater than the network threshold. If not, the contagion management system 106 determines if the network spread depth of the contagion will satisfy (e.g., meet or exceed) the network threshold at the next time period. Further, the contagion management system 106 can repeat this sub-act to determine it the network spread depth of the contagion will satisfy the network threshold at any upcoming time period giving the current network resistance parameter or if the contagion will reach equilibrium before the network threshold is reached.

Once the contagion management system 106 determines that the network threshold is satisfied, the contagion management system 106 can implement prevention measures by changing network settings. To illustrate, FIG. 5 shows that the act 230 includes a sub-act 534 of modifying network settings to increase network resilience.

As shown, the sub-act 534 can include additional sub-acts that correspond to the contagion management system 106 modifying network settings and increasing the network resilience of the network. For example, the sub-act 534 can include an additional sub-act 536 of reducing cross-global communication between non-neighbor nodes (e.g., non-directly connected nodes). For instance, in one or more implementations, the contagion management system 106 modifies network setting to reduce communication between nodes based on their network proximity (rather than on content).

To illustrate, in various implementations, the contagion management system 106 restricts a node's ability to communicate (e.g., view, access, comment, share, etc., posts or comments within a social networking system) with neighbor nodes and/or neighbors-of-neighbors. In some implementations, the contagion management system 106 restricts communications for a node to a first network connectivity amount (e.g., all nodes within ten network hops), a second network connectivity amount (e.g., all nodes within five network hops), or a third network connectivity amount (e.g., all nodes within three network hops) based on the magnitude of the network setting modifications. In some implementations, the contagion management system 106 hides or de-emphasizes reactions to posts (e.g., hides the number of likes, shares, comments, etc.)

In example implementations, the contagion management system 106 reduces cross-global communication between non-neighbor nodes by limiting the number of nodes with which a given node can connect and/or the number of groups nodes can join. In certain implementations, the contagion management system 106 reduces cross-global communication between non-neighbor nodes by limiting the size of network groups and/or limiting the number of communication, shares, reposts, etc., a node can perform in a set time period. Indeed, by reducing cross-global communication between non-neighbor nodes, the contagion management system 106 can reduce the global effect factor for non-infected nodes as well as the network as a whole. As a result, the contagion management system 106 can increase network resilience, which can slow, reduce, and/or prevent additional network spread of a contagion.

As shown, the sub-act 534 includes an additional sub-act 538 of appending a verification notification to the target characteristic. For example, in one or more implementations, the contagion management system 106 associates a message, warning, or other notification with the target characteristic. For example, if the target characteristic content within a social media post, the contagion management system 106 can add a message indicating that the post includes non-verified information, incorrect information, opinions contrary to facts, etc. In some implementations, the contagion management system 106 can indicate that a post includes verifiable and/or fact-checked information. In these examples, the contagion management system 106 can append the notification to the target characteristic within a social graph and display the notification in connection with the target characteristic each time the target characteristic is displayed.

In addition, the sub-act 534 includes an additional sub-act 540 of limiting the number of nodes that have the target characteristic. For example, in one or more implementations, the contagion management system 106 can reduce the spread of the contagion as well as increase network resilience by limiting the number of nodes that include the target characteristic to a predetermined number and/or portion of the network (e.g., 30% of the network). In example implementations, the contagion management system 106 can limit the spread of the contagion per day, per week, per month, etc. For instance, after a predetermined number of non-infected nodes have become infected, the contagion management system 106 prevents, limits, reduces, etc. the number of nodes in the network that can add the target characteristic during the allotted time.

As shown, the sub-act 534 includes an additional sub-act 542 of removing nodes having the target characteristic. For instance, in some implementations, the contagion management system 106 removes infected nodes from the network. In some implementations, the contagion management system 106 removes the target characteristic from an infected node. For example, the contagion management system 106 can remove a social media post that includes the target characteristic. In some instances, the contagion management system 106 provides an indication to the user account that the target characteristic will be or has been removed. In alternative implementations, the contagion management system 106 quarantines the infected node until the target characteristic is removed and/or a resolution is reached.

As noted above, in sub-act 532, the contagion management system 106 can determine that the number of nodes having the target characteristic satisfies a network threshold and, in response, the contagion management system 106 can modify network settings to increase network resilience, as shown in the sub-act 534. In addition, the contagion management system 106 can implement network setting modifications based on when the network threshold is expected to be satisfied. For example, if the network threshold is currently satisfied, the contagion management system 106 can immediately begin to modify network settings. If the network threshold is anticipated to be satisfied at an upcoming time period, the contagion management system 106 can implement the network setting modifications before that time period.

In some implementations, the contagion management system 106 can determine the magnitude of network setting modifications based on the amount of time remaining until the network threshold is satisfied. For example, for a network threshold that is forecasted to be satisfied in an upcoming time period such as two, three, or more time periods away, the contagion management system 106 can either wait one or more periods before applying network setting modifications and/or begin applying network setting modifications at a smaller magnitude. For instance, the contagion management system 106 applies one of the additional sub-acts 536-542 in a current time period and gradually adds more additional sub-acts 536-542 in subsequent time periods.

As shown in FIG. 5, the act 230 includes a sub-act 544 of causing one or more nodes to have a characteristic that is opposite to the target characteristic. For instance, in some implementations, the contagion management system 106 counters the target characteristic by adding, sharing, and/or spreading selected characteristics that oppose or neutralize the target characteristic or its effects. For example, if the target characteristic includes misinformation, the contagion management system 106 can share verified information and/or promote nodes having selected (e.g., chosen, identified, or designated) characteristics within the network. In this manner, the contagion management system 106 can slow, reduce, and/or prevent additional network spread of a contagion.

In some implementations, the contagion management system 106 ensures that the number of nodes having selected characteristics that counter the target characteristic spread such that they become larger than the number of nodes having the target characteristic. Indeed, the contagion management system 106 can utilize the spreading model and/or full-network spreading model as described to ensure that the selected characteristic outspreads the target characteristic.

As described above, in various implementations, the contagion management system 106 determines how deep and how quickly an initial set of infected nodes will spread throughout a network. In some implementations, the contagion management system 106 can determine an inverse spread. In particular, the contagion management system 106 can determine the number of nodes needed to achieve a target depth in a network (e.g., inverse depth of contagion). To illustrate, FIG. 6 shows determining a minimum starting size needed to achieve a target spreading depth in a network in accordance with one or more implementations.

Figure 6:
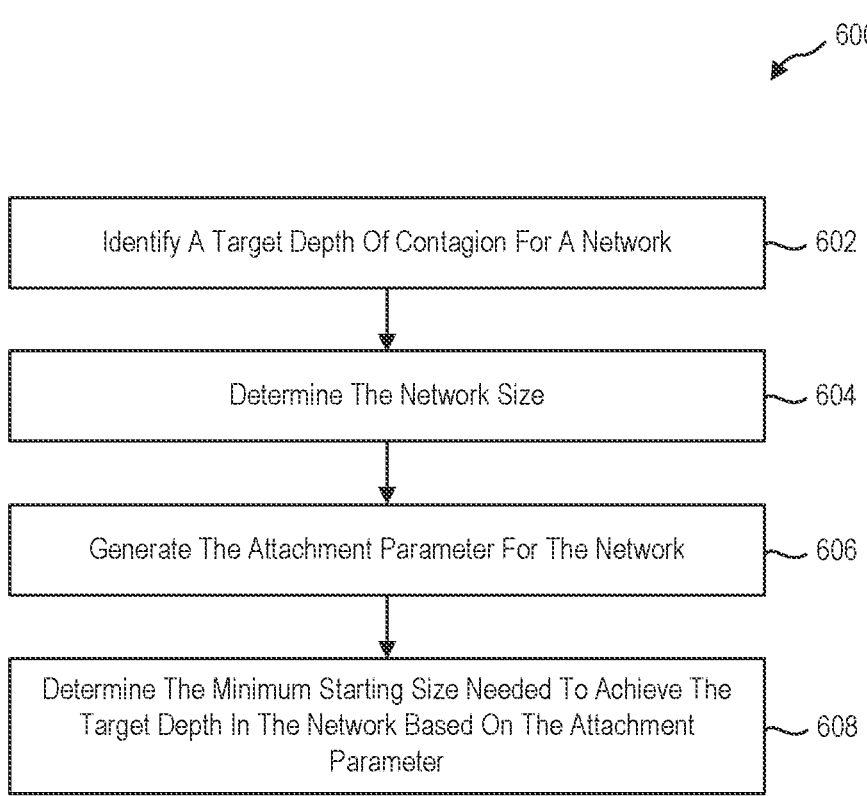
FIG. 6 illustrates determining a minimum starting size needed to achieve a target spreading depth in a network in accordance with one or more implementations.

As shown, FIG. 6 includes a series of acts 600 that the contagion management system 106 performs to determine the minimum number of nodes needed to spread a target characteristic to a target spreading depth in a network. As illustrated, the series of acts 600 includes an act 602 of identifying a target depth (e.g., target spreading depth) of contagion for a network. In some instances, the target spreading depth is the entire network. In other instances, the target spreading depth is a portion of the network, such as 40%, 55%, 75%, etc. of the network.

In addition, the series of acts 600 includes an act 604 of determining the network size. As described above, the contagion management system 106 can determine the total number of nodes in the network or determine the number of nodes is a subset of the network. In the latter case, the contagion management system 106 treats the subset network as it would the full network. For example, in these cases, the contagion management system 106 determines the number of nodes needed to spread to the target spreading depth within the subnetwork.

As shown, the series of acts 600 also includes an act 606 of generating the attachment parameter for the network. In a number of implementations, the contagion management system 106 determines the attachment parameter. As provided above, the attachment parameter can indicate the number of connections between nodes in the network. For example, the attachment parameter can indicate the average number of connections between neighboring nodes.

Further, the series of acts 600 includes an act 608 of determining the minimum starting size needed to achieve the target depth in the network based on the attachment parameter. For example, in various implementations, the contagion management system 106 utilizes the spreading model and or full-network spreading model along with a network resistance parameter (e.g., q) and the attachment parameter to determine the minimum starting size needed to achieve the target depth.

In one or more implementations, the contagion management system 106 determines the minimum starting set of nodes given the current network resistance parameter to reach the entire network. In various implementations, the contagion management system 106 determines the minimum starting set of nodes given the current network resistance parameter to reach a portion of the network. In example implementations, the contagion management system 106 determines the minimum starting set of nodes given the current network resistance parameter to reach some or all of the network within a desired time period. In some implementations, the contagion management system 106 varies the network resistance parameter and/or target spreading depth to determine different initial starting numbers of nodes.

Additionally, as with above, the contagion management system 106 considers not only local effects but also global effects when determining the minimum starting set of nodes needed to spread a target characteristic to the target spreading depth. In this manner, if the contagion management system 106 needs a target characteristic (e.g., a software update or critical piece of information) to spread throughout a network, the contagion management system 106 can supplement various nodes, even non-neighbor nodes, at or beyond the determined minimum of starting nodes and let the target characteristic naturally spread through the network. Indeed, the contagion management system 106 can provide the minimum amount of computer resources needed to seed the initial the network spread and allow the spread to occur in a natural manner.

In some implementations, the contagion management system 106 also determines which nodes to seed with a target characteristic. In other words, in various implementations, in addition to determining the minimum number of nodes, the contagion management system 106 also determines which nodes to seed with the target characteristic. In some implementations, the contagion management system 106 identifies specific nodes. In alternative implementations, the contagion management system 106 identifies general areas, groups, or subsets from which seed nodes are selected (e.g., one of the nodes in Subgroup A, two nodes in Subgroup B, etc.).

In some implementations, the contagion management system 106 identifies that one or more nodes within the network include the target characteristic. In these implementations, the contagion management system 106 can designate these nodes as seed nodes and support these nodes propagating the target characteristic. For example, the contagion management system 106 identifies seed nodes up to the determined minimum of starting nodes and changes network communication settings for these nodes to improve the dispersion of the target characteristic. For instance, the contagion management system 106 performs the opposite network connectivity adjustments than described above in connection with the sub-act 534 of FIG. 5. To illustrate, for the seed nodes, the contagion management system 106 increases cross-global communication between non-neighbor nodes and/or promotes these seed nodes when they share the target characteristic within the network.

Additional detail regarding performing inverse depth contagion is provided below in the Example Network Spreading Algorithms section, including Table 2, which shows examples of starting node set sizes needed to achieve a given depth of contagion given various network resistance and other parameters.

Example Network Spreading Algorithms

As mentioned above, the contagion management system 106 can implement measures to increase network resilience in the networking system based on determining network spreading effects of a contagion in the network. In particular, the contagion management system 106 can determine network spreading effects and other information about a contagion in a network based on the spreading model and full-network spreading model.

The following provides additional details and examples of the contagion management system 106 utilizing the spreading model (labeled as Algorithm 1) and the full-network spreading model (labeled as Algorithm 2) and the spreading model nested within the full-network spreading model (labeled as Algorithm 3).

As a note, while some of the terms used in the following examples differ from those used above, the correlation between terms and concepts will be evident. Additionally, the following examples are described in the context of game theory models having new features explicitly incorporated to determine misinformation (i.e., the target characteristic) in social networks (i.e., the network). In many instances, the game theory models provide a foundation to derive contagion probability and depth of contagion endogenously, based on individual and interdependent decision making. This allows the contagion management system 106 to extend the foundation and accurately derive and predict observed behavior and to study changes in predicted outcomes based on changes in individual behavior.

Moreover, in response to these models, the contagion management system 106 applies computationally implementable algorithms (e.g., Algorithms 1-3) to compute different outcomes of interest. In general, these models provide statistically accurate simulations of real-world social networking platforms and to enable the contagion management system 106 to accurately analyze the effects of different modeling parameters on the depth and spread of misinformation within networks including the effects of virality on networks.

Consider a network in which each person has a preference to coordinate with their friends (or network neighbors) on the choice of two actions. Suppose this preference dictates that it is beneficial for a node to choose an action if a sufficiently large fraction of neighbor nodes also choose that action. This causes the node to choose an action based on the choices of some of their neighbor nodes, which may cause some of the node's other neighbor's node to choose the same action, and in turn, cause additional neighbor nodes (e.g., "friends-of-friends" nodes) to choose the same action, propagating a chain reaction and causing contagion.

Additionally, consider the theoretical properties of contagion arising from individual node decisions in coordination games on networks. For instance, suppose there are finitely many players (i.e., nodes) in a connected network. Each player can take one of two actions, 0 or 1, and each player is initially playing 0. Suppose an initial subset of players S is exogenously infected to play 1 and the goal is to determine response dynamics such that an initial subset of S players leads all players in the network to play 1 (e.g., mimicking realistic spread in social networking systems). As a parameter of the game, suppose that action 1 is the best response for a player if fraction $q \in [0, 1]$ of the player's neighbors play 1. In many implementations, the parameter q (e.g., a network resilience parameter) is derived analytically from an underlying tradeoff between the benefit of coordination b and cost of miscoordination c to yield $q=c/(b+c)$. In this sense, it may be viewed as a relative cost of miscoordination as well as a measure of network resilience to contagion. The higher q is, the harder it is for a player to play 1.

In some implementations, contagion occurs from S to the entire network if the complement of S is uniformly no more than (1-q)-cohesive. For context, a starting set A of players is (1-q)-cohesive if each player in A has at least fraction 1-q of their neighbors in A. Set A is uniformly no more than (1-q)-cohesive if every nonempty subset of A is at most (1-q)-cohesive. In order to apply this result, in various implementations, every subset of the complement of S is checked to be at most (1-q)-cohesive. Such a task is exponentially expensive, making its application infeasible beyond very small networks.

In addition to the computational obstacle associated with existing systems, as noted above, existing systems provide results that are limited to coordination games with only local network effects (e.g., where a player's payoff depends solely on the actions of their neighbors). In many instances, their neighbors must also have uniform unit weights.

Accordingly, the systems and methods of the contagion management system 106 solve the above problems. The contagion management system 106 capitalizes and extends beyond the existing theoretical model of a network coordination game to include a new, flexible, and tractable formulation of global effects. In many implementations, as noted above, global effects in a network capture the notion that each player's decision depends not just on decisions of their neighbors but also on an aggregate based on decisions taken by others in the network. Indeed, the contagion management system 106 utilizes new, natural, and tractable algorithms that apply to an arbitrary network coordination game with heterogeneous local and global effects and arbitrary starting set S to compute equilibrium depth of contagion starting from S and q, and also compute all q for which contagion spreads from S to the entire network in equilibrium. Further, the contagion management system 106 is more efficient than existing systems that require polynomial or quadratic complexity.

Global effects are included as an additive component to a player's payoff, making them transparent and tractable while still allowing for natural interactions with local effects in the best response and facilitating the computation of equilibrium. These effects are otherwise flexible in that the contagion management system 106 allows global effects to be weakly increasing. Indeed, the contagion management system 106 imposes no restrictions related to continuity, convexity, concavity, differentiability, etc., and the contagion management system 106 allows for heterogeneity in global effects for different players. Moreover, the contagion management system 106 also allows for heterogeneity in local effects (e.g., different weights for different neighbors of a player, asymmetric weights for different players, and unidirectional links). The contagion management system 106 also considers players who may be exogenously infected to play 1.

As an overview, the contagion management system 106 utilizes algorithms based on realistic, best response dynamics that operate at a high level (e.g., the player's level), thereby exponentially reducing computational burdens. For instance, the contagion management system 106 utilizes Algorithm 1, which formalizes best response dynamics within a generalized model. In particular, starting from an arbitrary set S of players with an incentive to play 1 at $q \in [0, 1]$, Algorithm 1 delivers an equilibrium object $C(S, q)$, which is the smallest Nash equilibrium (of players playing 1) that contains S.

The contagion management system 106 also utilizes Algorithm 2, which leverages bootstrapping properties of Algorithm 1 to derive a finite sequence of strictly increasing Nash equilibria $C(S, q_n)$ that converges to the full network and a corresponding strictly decreasing sequence of $(q_n)$ that converges to $q^*$, which is the largest q for which contagion occurs from S to the entire network. Algorithm 2 provides a new and computationally tractable characterization of the set of all q for which contagion occurs from S to the entire network.

The contagion management system 106 also utilizes Algorithm 2, which combines Algorithm 1 and Algorithm 2. Because of bootstrapping, when utilizing Algorithm 3, the contagion management system 106 can determine the maximum number of nonempty subsets of the complement of S that are checked is no more than the number of players in the complement of S.

The algorithms utilized by the contagion management system 106 provide novel and computationally tractable characterizations of several concepts. Examples include characterizing when contagion occurs from S to the entire network, characterizing when a set S is q-cohesive and its complement is (1-q)-cohesive, characterizing when the complement of S is uniformly no more than (1-q)-cohesive, and characterizing when conventions 0 and 1 coexist in equilibrium.

The contagion management system 106 utilizes the algorithm outputs to define and compute several equilibrium objects that facilitate the general study of contagion in networks. In addition to $q^*$, outputs of Algorithm 2 can be used to compute, at an equilibrium state, a spreading depth and/or contagion depth function (i.e., $\delta(S, q)$ for every $q \in [0, 1]$). This measures the equilibrium depth of proliferation of an action in the population starting from a given set S at q. The difference between contagion depth $\delta(S, q)$ and the size of its starting set S can provide an indication of virality by measuring the incremental proliferation of an action beyond the starting set S in equilibrium.

In addition, as noted above, the contagion management system 106 shows how to numerically invert $\delta(S, q)$ to determine other queries. For example, the contagion management system 106 can determine the answer to the question of what is the smallest starting set size S needed to achieve a target depth in equilibrium given a target depth of contagion $\delta \in [0, 1]$ and $q \in [0, 1]$.

In various implementations, the contagion management system 106 can provide broader benefits in the sense it applies to most or all network coordination games with otherwise arbitrarily specified and heterogeneous local and global effects. Furthermore, the algorithms utilized by the contagion management system 106 may be run with computing power that is accessible to most practitioners. Accordingly, given the wide range of practical applications, the contagion management system 106 can accurately determine interactions among many different configurations of networks, local effects, and global effects, as well as provide tradeoff information among connectivity, network resilience, global impact, and other variables.

In various implementations, the contagion management system 106 utilizes an attachment parameter m (e.g., a connectivity parameter). As noted above, an attachment parameter can refer to a positive integer signifying the number of existing nodes to which each new node is connected.

In some implementations, for each attachment parameter $m \in \{5, 10, 20\}$, the contagion management system 106 generates 40 scale-free networks of 1,000 players. For each network, the contagion management system 106 randomly samples 50 starting sets S each of sizes 10 through 990 (at increments of 10). In these implementations, the contagion management system 106 parameterizes global effects as $\alpha \in \{0, 0.5, 1\}$ with $\alpha=0$ signifying the model without global effects, $\alpha=1$ for the model with global effects, and $\alpha=0.5$ for the case of intermediate impact of global effects. For each combination $(m, \alpha)$ and each starting set S, the contagion management system 106 utilizes the algorithms to compute the contagion threshold and contagion depth function. In the above examples, the contagion management system 106 yields 1,782,000 complete runs of the algorithms. In some instances, the contagion management system 106 performs several million additional runs of the algorithms with additional variations in parameters conducted to verify robustness.

In utilizing the contagion management system 106, researchers found that a larger starting set size generally correlates with a greater impact of global effects on the contagion threshold and depth of contagion. Also, a large starting set directly influences more people to play 1 and also increases the global impact because more people are playing 1 in the aggregate. This complementarity naturally captures a snowball effect of contagion resulting from increasing returns. Indeed, after a point, global impact overrides local obstacles to switch to 1. In low or moderate connectivity networks (m=5, 10) with global effects ($\alpha=1$), if 40 percent of the network is infected (has an incentive to play 1 at q=1), the ability to spot the contagion from spreading to the entire network becomes very difficult.

Utilizing the contagion management system 106, researchers also discovered that in the absence of global effects, contagion becomes harder to spread at higher resilience q (e.g., a network resistance parameter). With global effects, contagion spreads deeper and uses smaller starting sets. Researchers also discovered that complementarity between global effects and network resilience implies that the equilibrium impact of global effects is higher when network resilience is higher. This increases the range of starting set sizes that leads to full network contagion and brings the contagion depth closer to a tipping point (e.g., a narrow interval of starting set sizes below which there is no contagion and above which there is full contagion).

Additionally, researchers also discovered that, for inverse depth of contagion, a broad pattern emerges that, on average, in order to spread contagion to a given depth $\delta \in [0, 1]$ of the network, smaller starting sets are needed if network resilience is lower, global effects are higher, network connectivity is lower, or a combination of these. According, based on a network analysis utilizes the algorithms, the contagion management system 106 can apply modifications to these parameters where possible to achieve a given depth of contagion and/or reduce network contagion.

In various implementations, the contagion management system 106 is implemented in connection with a binary action network coordination game, as described below. For instance, consider a canonical 2×2 coordination game in which each player (e.g., node in a network) chooses action 0 or 1. Action 0 may be viewed as a baseline action (or established belief) and 1 as a new action or deviation from baseline. For example, playing 0 may entail abiding by some societal norm, adhering to a traditional policy, or believing an established narrative.

In addition, playing 1 entails a departure from an established societal norm, adopting a new standard or policy, or choosing to believe an alternative narrative. The payoff from coordinating on the baseline action is normalized to 0 for each player. The benefit from coordinating on action 1 is $b \geq 0$ for each player. The cost of deviating to 1 when the other player stays at baseline is $c \geq 0$ for the deviating player. By mis-coordinating with a friend, a node breaks with existing social norms or accepted policy and risks conflict and estrangement from those playing 0. The setup assumes that at least one of b or c is positive, or equivalently, $b+c>0$. The game has two strict Nash equilibria: (0, 0) and (1, 1).

In some instances, the game has the following setup:

|   | 1 | 0 |
|---|---|---|
| 1 | b, b | −c, 0 |
| 0 | 0, −c | 0, 0 |

Here, a network is a pair (I, g), where $I=\{1, \ldots, I\}$ is a finite set of players (or nodes) in the network and g specifies which players are connected to each other. For each player i in the network (I, g), the neighbors of i are $N_i=(j \in I \setminus \{i\} | ij \in g\}$ and i is the number of its neighbors, denoted $d_i=|N_i|$. A network (I, g) is connected, if, for every pair of players i and j, there is a sequence of indices $(i_1=i, i_2, \ldots, i_{k-1}, i_k=j)$ such that $i_{l i l+1} \in g$ for every $l=1, \ldots, k-1$.

In a network, incentives for each player to coordinate with their neighbors are viewed in terms of the 2×2 coordination game above. Each person's payoff depends on the choice of their network neighbors. If player i plays 1 and neighbor $j \in N_i$ also plays 1, player i garners some benefit due to solidarity, conformity effects, or other positive effects of coordination. Player i also garners some benefit by seeing a neighbor (e.g., friend) deviate to 1, which can provide justification for a node's own deviation. The game models this the benefit $b \geq 0$ that player i receives for each neighbor j with whom i coordinates on playing 1. Playing 1 has a drawback if neighbor j plays 0. The game models miscoordination with a neighbor as the cost $c \geq 0$ that player i playing 1 incurs for each neighbor j who plays 0. In this setup, for convenience, the payoff to a player from playing baseline action 0 is normalized to be 0 so that b and c represent benefit and cost of deviation from baseline.

As mentioned above, the contagion management system 106 also allows for heterogeneity. For example, this game setup includes the importance of different neighbors by including weight $w_{i,j} \geq 0$ that player i puts on the relevance of neighbor j's action. Thus, the weighted benefit to player i from coordination on 1 with neighbor j is $w_{i,j}b$ and the weighted cost to player i from playing 1 when neighbor j plays 0 is $w_{i,j}c$ for each $j \in N_i$. In addition, in the game setup, let $w_i=\Sigma_{j \in N_i} w_{i,j}$ for non-trivial results, assume that $w_i>0$. In addition to heterogeneity in neighbor effects, this setup of the contagion management system 106 formulation allows for asymmetric weights—that is, for $i \neq j$, $w_{i,j}$ is not necessarily equal to $w_{j,i}$. Further, it can allow for unidirectional links—that is, for $i \neq j$, $w_{i,j}$ may be zero but $w_{j,i}$ may be positive.

The game can include a network coordination game with local effects setup as a tuple $\Gamma=(I, g\ (A_i, u_i)_{i \in I})$, where (I, g) is a connected network, the action space of player $I \in I$ is $A_i=\{0, 1\}$, the joint action space is $A=A_1 \times \ldots \times A_I$. In addition, the player i payoff is $u_i A \rightarrow \mathbb{R}$ and is given by $u_i(a_i, a_{-i})=\Sigma_{j \in N_i} w_{i,j} \hat{u}_i(a_i, a_i)$, where $\hat{u}_i(a_i, a_i)$ is the payoff of player i from playing the 2×2 coordination game with neighbor j and $w_{i,j}$ is weight placed by player i on neighbor j.

In a network coordination game with (heterogeneous) local effects, 1 is the best response of player I, if, and only if, $u_i(1, a_{-i}) \geq (0, a_{-i})$, which holds exactly when $$\frac{1}{w_i} \sum_{j \in Ni} w_{i,j} a_j \geq \frac{c}{b+c}.$$

Let $s_i=\Sigma_{j \in N_i} w_{i,j} a_j$ be the weighted number of neighbors of I who play 1 and let $$q = \frac{c}{b+c} \in [0, 1]$$

be a reduced form parameter summarizing the relative cost of miscoordination. In other words, 1 is the best response of player I, if, and only if, $$\frac{s_i}{w_i} \geq q.$$

In the special case when each neighbor has uniform unit weight (e.g., $w_{i,j}=1$), this condition specializes to $$\frac{s_i}{d_i} \geq q$$

that is, the fraction of player i's neighbors who are playing 1 is at least q.

In some instances, the contagion management system 106 employs the condition that coordinating on 1 gives payoff b and coordinating on 0 gives payoff 0. Relabeling can reverse these payoffs, for example, by setting the payoff from playing 1 to 0, and the payoff from playing 0 depends on whether the opponent is playing 0 (in which case payoff is b) or 1 (in which case payoff is −c). In some instances, the threshold to play 1 is then given in terms of 1-q and the entire analysis to proliferate action 1 can be carried out analogously.

As provided above, the parameter q (e.g., a network resistance parameter) may be viewed as an index of network resilience to contagion. When player i plays 1, b indexes intensity of benefit of coordination with neighbors who play 1, c indexes intensity of cost of miscoordination with neighbors who play 0, and $$q = \frac{c}{b+c}$$

measures the relative cost of miscoordination with neighbors who play 0. When q is low, the miscoordination cost is relatively low, and it is easier for player i to switch to 1 (easier for $$\frac{s_i}{w_i} \geq q$$

to hold). When q is high, the miscoordination cost is relatively high and it is harder for player i to switch to 1. In other words, in a network with high q, the network is more resilient to contagion.

As provided above, an important feature of contagion spread in networks is the role of global effects. In many implementations, global effects capture the concept that player i may take action 1 when a large number of other players take action 1 even if they are not network neighbors of i. For example, in social networks (e.g., social networking systems), this may be achieved by publishing trending topics, or the numbers of likes or retweets, and these are visible to every player (or vice versa).

Accordingly, the contagion management system 106 facilitates the network coordination game to include global effects. In one or more implementations, global effects are as follows. Given player i, and a profile $a_{-i}$ of actions of other players in the network, let $$p_i(a_{-i}) = \frac{1}{1 - d_i - 1} \sum_{j \notin N_i \cup \{i\}} a_j$$

be the fraction of the network (not including i or neighbors of i) that plays 1. Here, player i gets some additional benefit from playing 1 that depends positively on this aggregate proportion. This may be formalized by a (weakly) increasing function $\emptyset_i$: [0, 1]→$\mathbb{R}_+$ such that payoff to player i from playing 1 is given by $u_i(1, a_{-i}) = \sum_{j \in N_i} w_{i,j} \hat{u}_i(1, a_j) + \emptyset_i(p_i(a_{-i}))$ with the natural normalization that $\emptyset_i(0)=0$. In some implementations, the contagion management system 106 suppresses the notation $a_{-i}$ in $p_i(a_{-i})$.

Indeed, in a network coordination game with local and global effects payoff of each player i is given by $u_i(1, a_{-i}) = \sum_{j \in N_i} w_{i,j} \hat{u}_i(1, a_j) + \emptyset_i(p_i(a_{-i}))$, and $u_i(0, a_{-i})=0$, where $\emptyset_i$: [0,1]→$\mathbb{R}_+$ is a (weakly) increasing function with $\emptyset_i(0)$. Notice that a network coordination game with local and global effects is a game with strategic complements because payoff of each player satisfies increasing differences: $u_i(1, a_{-i}) - u_i(0, a_{-i})$ is (weakly) increasing in $a_{-i}$. Indeed, this holds for a (weakly) increasing function of the form $\emptyset_i(a_{-i})$, without composing with $p_i(a_{-i})$, and our results hold for this generalization. In some implementations, the contagion management system 106 uses $p_i(a_{-i})$ to aid intuition for global effects. Moreover, it follows that a network coordination game with local effects is the special case when each $\emptyset_i$ is zero.

In some instances, with heterogeneous local and global effects, 1 is the best response of player i, if, and only if, $u_i(1, a_{-i}) \geq u_i(0, a_{-i})$, which holds exactly when $$\frac{s_i}{w_i} \geq q - \frac{\phi_i(p_i)}{w_i(b+c)},$$

where $s_i$ and q are as above. As $\emptyset_i$ is (weakly) increasing, the threshold (weighted) fraction of neighbors who play 1 before i switches to 1 decreases in pi. In other words, with global effects, a smaller fraction of a giver player's neighbors need to play 1 as compared to the case with local effects only.

To ensure that the threshold fraction $$q - \frac{\phi_i(p_i)}{w_i(b+c)}$$

is nonnegative (e.g., the global effects alone do not make 1 strictly dominant for player i), it is necessary and sufficient that $\emptyset_i(p_i) \leq cw_i$. The contagion management system 106 may impose this constraint going forward but impose no other restrictions on $\emptyset_i$ in terms of continuity, differentiability, concavity, convexity, etc.

In some instances, when $\emptyset_i$ is zero, the condition $$\frac{s_i}{w_i} + \frac{\phi_i(p_i)}{w_i(b+c)} \geq q,$$

specializes to $$\frac{s_i}{w_i} \geq q,$$

and with equal and unit weights to $$\frac{s_i}{d_i} \geq q.$$

With global effects, there may be an additional contribution of b and c in a player's decision, as shown in the term $$\frac{\phi_i(p_i)}{w_i(b+c)}.$$

Without loss of generality, the contagion management system 106 may adopt a normalization fix c to be a positive constant and consider the one-to-one mapping $$b \mapsto q = \frac{c}{b+c}.$$

Intuitively, this normalization fixes miscoordination cost at some baseline value c>0 (for example, c=1) and coordination benefit b is measured relative to baseline cost. Indeed, in various implementations, the contagion management system 106 includes complementarities in several parameters in a natural manner. For instance, the condition $u_i(1, a_{-i}) \geq u_i(0, a_{-i})$ is written equivalently as $$\frac{s_i(a_{-i})}{w_i} + \frac{\phi_i(p_i(a_{-i}))}{w_i c} q \geq q$$

and further as $$\frac{c s_i(a_{-i})}{w_i - \phi_i(p_i(a_{-i}))} - q \geq 0.$$

These formulations show that in addition to increasing differences in $(a_i, a_{-i})$, the payoff function has single crossing property in $(a_i, \varphi_i)$ capturing a natural complementarity with overall global effects. Additionally, considering $-q$ as inverse network resilience or network "vulnerability" (to local effects), the payoff function has single crossing property in $(a_i, -q)$ capturing a complementarity with inverse network resilience or network vulnerability. Further, a cross partial of payoff with respect to $\varphi_i$ and q (c is fixed) yields $$\frac{1}{w_i c}$$

showing a complementarity between network resilience and global effects. Accordingly, the greater network resilience, the larger the impact of global effect to switch a given player to play 1. Indeed, these relationships emerge explicitly in Monte Carlo simulations of equilibrium objects.

In many implementations, a profile of actions $a^* = (a^*_1, \ldots, a^*_I)$ is a Nash equilibrium at q, if for every player I, $a^*_i$ is a best response to $a^*_{-i}$.

In some instances, the contagion management system 106 identifies a profile of actions $a = (a_1, \ldots a^*_I)$ with the subset of players who play 1, that is, with $E = \{i \in I | a_i = a_I\}$, and conversely, each subset E of 1 is identified with the profile in which player i plays 1, if $i \in E$. Here, if $E \subseteq I$ is the set of players playing 1, the contagion management system 106 may determine the (weighted) number of neighbors of i who play 1 as $s_i = \Sigma_{j \in N_i \cap E} w_{i,j}$ and the (weighted) fraction of neighbors of i who play 1 as $$\frac{s_i}{w_i}.$$

The contagion management system 106 determines a fraction of the rest of the network (excluding i and neighbors of i) that plays 1 as $$p_i = \frac{|E(N_i \cup \{i\})|}{I - d_i - 1},$$

where $|A|$ denotes the cardinality of Set A. In some instances, within the setup, the dependence of $s_i$ and $p_i$ on E is denoted $s_i(E)$ and $p_i(E)$, respectively. If $E = \emptyset$, then $s_i(E) = p_i(E) = 0$.

In various instances, the contagion management system 106 adopts the premise that when indifference between 0 and 1 arises for a player, the player plays 1. Accordingly, the contagion management system 106 can determine that for a network coordination game with heterogeneous local and local effects, set $E \subseteq I$ is a Nash equilibrium at q when every $$i \in E, \frac{s_i(E)}{w_i} + \frac{\phi_i(p_i(E))}{w_i(b + c)} \geq q$$

and every $$i \in I \backslash E, \frac{s_i(E)}{w_i} + \frac{\phi_i(p_i(E))}{w_i(b + c)} < q.$$

The setup of the network coordination game can include players who may be exogenously infected to play 1 as in various implementations. For example, Player i is exogenously infected to play 1 if 1 is strictly dominant for player I. This instance can be formalized by setting $u_i(1, a_{-i}) = 1$ and $u_i(0, a_{-i}) = 0$ for such a player. In some implementations, the set of players exogenously infected to play 1 is denoted $\mathcal{D} \subseteq I$. The contagion management system 106 can allow for the case that $\mathcal{D} = \emptyset$.

In one or more implementations, equilibrium is characterized as a set $E \subseteq I$ being at a Nash equilibrium at q when D S E and for every $$i \in E \backslash \mathcal{D}, \frac{s_i(E)}{w_i} + \frac{\phi_i(p_i(E))}{w_i(b + c)} \geq q$$

and for every $$i \in I \backslash E, \frac{s_i(E)}{w_i} + \frac{\phi_i(p_i(E))}{w_i(b + c)} < q.$$

In addition, two conditions for player i to play 1 are summarized by saying that for a given set S of players, player $i \in S$ has an incentive to play 1 at q, if either $$i \in \mathcal{D} \text{ or } \frac{s_i(S)}{w_i} + \frac{\phi_i(p_i(S))}{w_i(b + c)} \geq q.$$

Moreover, S is a set of players with an incentive to play 1 at q, if every player $i \in S$ has an incentive to play 1 at q. As a result, in various implementations, if $S \subseteq \mathcal{D}$, then for every $q \in [0, 1]$, S is a set of players with an incentive to play 1 at q.

In example implementations, the contagion management system 106 employs Monte Carlo simulations to verify computationally and tractable versions of the models (e.g., the spreading model and the full-network spreading model and/or Algorithm 1-3). Here, the contagion management system 106 assumes that each neighbor has the same unit weight (e.g., $w_{i,j} = 1$ for every $j \in N_i$) and supposes $\phi_i(p_i) = \alpha c d_i p_i$ where $a \in [0, 1]$ is a parameter capturing the intensity of the global effect on infection outcome (e.g., payoffs). In these implementations, the contagion management system 106 captures the different impacts succinctly.

To illustrate, the function $\emptyset_i$ is (weakly) increasing in $p_i$ (and strictly increasing when $\alpha>0$). In addition, the term $cd_i$ is the upper bound on $\emptyset_i$ to keep the threshold nonnegative and the term a captures an intensity of global effect (e.g., when $\alpha=0$, there are no global effects on payoffs and $\alpha=1$ indexes the full global effect). In various implementations, the formulation is computationally tractable in the sense that 1 the best response of player I when $$\frac{s_i}{d_i} \geq q(1 - ap_i).$$

In certain implementations, both $\alpha$ and $p_i$ serve to lower the switching threshold in an intuitive and analytically tractable manner. Thus, there is complementarity among $\alpha$, $p_i$, and q such that the higher is one, the greater is the impact of the others to lower the threshold to play 1.

Turning now to the contagion algorithms (e.g., Algorithm 1-3), suppose there is an initial set S of players who have an incentive to play 1 (either based on the configuration of play given by S or due to an exogenous infection). Suppose player $i \notin S$ is playing 0. If a sufficiently large proportion of i's neighbors play 1, player i finds it optimal to play 1 as well. This may further induce some of player i's other neighbors who were playing 0 to play 1, spreading action 1 further along. This is the underlying dynamic for proliferation based on local network effects. Moreover, as more players in the network play 1, this may induce a player to play 1 even if fewer of its neighbors are playing 1. This is the impact on proliferation based on global network effects. The contagion management system 106 can employ the best response dynamics by iterating this process, including local and global effects simultaneously, as described above and shown below in detail.

In various implementations, the contagion management system 106 provides the following algorithms to determine the extent of proliferation of action 1 starting from an arbitrary subset S of players playing 1 at an arbitrary threshold $$q = \frac{c}{b+c} \in [0, 1].$$

To illustrate, the contagion management system 106 utilizes Algorithm 1 to determine the largest q for which contagion occurs from S to the entire network.

---

Algorithm 1 (Depth of Contagion Starting from (S, q))

1. Let S be a set of players with an incentive to play 1 at $$q = \frac{c}{b+c} \in [0, 1].$$

2. Let $C_0 = S \cup D$ and $B_0 = I\backslash C_0$.
3. For $t \geq 0$, recursively define:

$$F_{t+1} = \left\{ i \in B_t \,\middle|\, \frac{s_i(C_t)}{w_i} + \frac{\emptyset_i(p_i(C_i))}{w_i(b+c)} \geq q \right\},$$

$C_{t+1} = C_t \cup F_{t+1}$, and
$B_{t+1} = I\backslash C_{t+1}$.
4. Let T be the first t such that $C_{t+1} = C_t$ and let $C(S, q) = C_T$.

---

Algorithm 1 formalizes best response dynamics starting from an initial set S of players with an incentive to play 1 at q. In various implementations, the starting set is the set of exogenously infected players or contains it (S=D or S⊇D) the case that there may be exogenously infected players not in S is possible, that is, D\S≠∅. In some implementations, these players can play 1 and affect the best response dynamics and therefore are included in the contagion set at the beginning of the algorithm by setting $C_0=S\cup D$. At each step t+1, Algorithm 1 identifies players not in the contagion set $C_t$ who have an incentive to play 1, denoted $F_{t+1}$ and includes them in $C_{t+1}$. Algorithm 1 stops when there are no more players left to flip (e.g., become infected) or the first t such that $F_{t+1}=0$. In these implementations, the ending contagion set is C(S,q). In some implementations, stage t dependence of Algorithm 1 is denoted on the starting parameters (S,q) by $F_t=F_t(S, q)$, $C_t=C_t(S, q)$, and $B_t=B_t(S, q)$.

In various implementations, by construction, the sequence $$(C_t)_{t=0}^T$$

is an increasing sequence of sets starting at $C_0=S\cup D$ and ending at C(S, q). As a computational benefit, as the number of players is finite, The contagion management system 106 stops Algorithm 1 after an upper bound of |I\S| iterations based on the number of subsets of the complement of S that are evaluated.

In many implementations, Algorithm 1 allows for S=∅ and D=∅. In these cases, when q>0, then $F_1=∅$ and Algorithm 1 stops in one step and C(S, q)=∅, which is a Nash equilibrium. If q=0, then $F_1=I$ and Algorithm 1 stops after two steps and C(S, q)=I, which is also a Nash equilibrium. Indeed, if q=0, then for every S and D, Algorithm 1 stops after at most two steps and C(S, q)=I.

As a benefit, the contagion management system 106 can utilize Algorithm 1 at any point in the strategy space because S is an arbitrary subset of players. Moreover, the best response dynamics increase (weakly) in most cases because S is a set of players with an incentive to play 1 at q. According, Algorithm 1 shows that the contagion management system 106 can start from an arbitrary set S of players playing 1 and an arbitrary threshold q and determine the set C(S,q) of players in I that will play action 1 (e.g., become infected).

---

Algorithm 2 (Full network contagion starting from S)

1. Let S be a set of players with an incentive to play 1 at q = 1.
2. Define $A_0 = S$ and $q_0 = 1$ (and therefore, $b_0 = 0$).
3. For $n \geq 0$, define $(A_{n+1}, q_{n+1})$ recursively as follows:
   (a) Apply Algorithm 1 with $(A_n, q_n)$ to determine $A_{n+1} = C(A_n, q_n)$.
   (b) If $A_{n+1} \neq I$, let $q = \max_{i \notin A_{n+1}} \frac{cs_i(A_{n+1})}{cw_i - \emptyset_i(p_i(A_{n+1}))}$ and let $b_{n+1} = \frac{c(1 - q_{n+1})}{q_{n+1}}$ 4. Let N be the first n such that $A_{n+1} = I$ and let $q^* = q_N$.

---

Algorithm 2, which is directed toward a network coordination game with local and global effects, starts with an initial set S of players who have an incentive to play 1 at q=1. This is the case when S=D (or S⊆D). In addition, Algorithm 2 recursively searches for the next lower q that allows the contagion set resulting from Algorithm 1 to keep expanding. To motivate statement 3(b) in Algorithm 2, $$\frac{s_i}{w_i} + \frac{\phi_i(p_i)}{w_i} = \frac{s_i}{w_i} + \frac{\phi_i(p_i)}{w_i} q.$$

In this manner, the threshold to switch $$\frac{s_i}{w_i} + \frac{\phi_i(p_i)}{w_i(b+c)} = q$$

can be written as $$\frac{cs_i}{cw_i - \phi_i(p_i)} = q.$$

Moreover, $i \notin C(A_n, q_n)$ implies $\phi_i(p_i) < cw_i$ so that the denominator is positive.

The contagion management system 106 starts Algorithm 2 with $q_0=1$ and applies Algorithm 1 to determine C(S, 1). If contagion has not spread to the entire network with C(S, 1), Algorithm 2 looks at the threshold computations of the remaining players and selects one with the highest threshold and sets $q_i$ to be this threshold. This $q_i$ is the threshold closest to 1 that is just enough to give this "marginal" player an incentive to play 1. Then, the contagion management system 106 runs Algorithm 1 again to see the full ramification of lowering the threshold to $q_1$. If contagion has not yet spread to the entire network, the contagion management system 106 follows the same process to lower q just enough to switch the next marginal player and apply Algorithm 1 again.

Algorithm 2 stops at the first time period when contagion spreads to the entire network. As a benefit, because the number of players in the network is finite, Algorithm 2 stops in finitely many iterations and there are never more than the number of players in I\S. Additionally, the contagion management system 106 may determine full network contagions utilizing considerably fewer iterations depending on the spread of the contagion in Algorithm 1 at each step. The contagion management system 106 determines the resulting q* from Algorithm 2 as the contagion threshold for the network with starting set S.

In one or more implementations, the contagion management system 106 utilizes Algorithm 2 to output an increasing sequence of Nash equilibria that starts from C(S, 1) and expands to the entire network. At each step, the expansion at the end of that step is the smallest Nash equilibrium extension of the beginning set for that step. Moreover, at the end of each step, Algorithm 2 determines the smallest decrease in q that is needed to continue the further proliferation of action 1 in the network. In this sense, for an arbitrary starting set S, Algorithm 2 provides an expanding equilibrium-by-equilibrium proliferation of action 1 to the entire network, using a minimal decrease in q to expand contagion from one equilibrium to the next.

In various implementations, the contagion management system 106 equates equilibrium-by-equilibrium expansion up to step n+1 with the one step contagion from initial S using threshold $q_n$, using the bootstrapping feature of Algorithm 1. In some instances, for every threshold $q \leq q^*$, the contagion occurs from S to I at q.

---

Algorithm 3 (Algorithm 2 With Nested Algorithm 1)

1. Let S be a set of players with an incentive to play 1 at q = 1.
2. Let $A_0 = S \cup D$ and $q_0 = 1$.
3. For $n \geq 0$, define $(A_{n+1}, q_{n+1})$ recursively as follows:
   (a) For t = 0, let $C_{n,t} = A_n$ and $B_{n,t} = I \backslash C_{n,t}$,
   (b) For $t \geq 0$, recursively define:

$$F_{n,t+1} = \left\{ i \in B_{n,t} \, \middle| \, \frac{s_i(C_{n,t})}{w_i} + \frac{\phi_i(p_i(C_{n,t}))}{w_i(b+c)} \geq q_n \right\},$$

$C_{n,t+1} = C_{n,t} \cup F_{n,t+1}$, and
$B_{n,t+1} = I \backslash C_{n,t+1}$.
   (c) Let T(n) be the first t such that $C_{n,t+1} = C_{n,t}$ and let $C(S, q) = C_{n,t}$.
   (d) Let $A_{n+1} = C_{n,T(n)}$ and $$q_{n+1} = \begin{cases} \max_{i \notin A_{n+1}} \dfrac{cs_i(A_{n+1})}{cw_i - \phi_i(p_i(A_{n+1}))} & \text{if } C_{n,T(n)} \neq I \\ q_n & \text{if } C_{n,T(n)} = I \end{cases}$$

4. Let N be the first n such that $q_{n+1} = q_n$ and let $q^* = q_N$.

---

Algorithm 3 generates a sequence of sets $$\left\{ (C_{n,t})_{t=0}^{T(n)} \right\}_{n=0}^{N}$$

starting from $C_{0,0} = A_0 = S \cup D$ and ending at I. In some implementations, there are redundant sets in this sequence at transition points between different runs, given by $C_{n,T(n)} = C_{n+1,0}$. In various implementations, the contagion management system 106 removes these sets and includes the starting set by letting $$\left\{ S, (C_{n,t})_{t=1}^{T(n)} \right\}_{n=0}^{N}$$

be the sequence of sets given by S, $C_{0,1}, \ldots, C_{0,T(0)}$, $C_{1,1}, \ldots, C_{1,T(1)}, C_{2,1}, \ldots, C_{N-1,T(N-1)}, C_{N,1}, \ldots, C_{N,T(N)}$.

Additionally, in various implementations, the contagion management system 106 employs an upper bound to the number of subsets checked to determine q* as the number of players in I\S as compared to the number of subsets of I\S, which is an exponential improvement. Further, in various implementations, a special characteristic of the q* determined with Algorithm 2 is that it is the largest q for which C(S, q)=I, which can refer to the contagion threshold. In various implementations, Let 1 be a network coordination game with local and global effects and consider a set S of players with an incentive to play 1. The contagion threshold for S is $q^* = \sup\{q \in [0, 1] | C(S, q) = I\}$.

Pseudocode for Algorithm 3 showing Algorithm 2 with nested Algorithm 1 is provided below:

---

| | Algorithm 3 Pseudocode |
|---|---|
| 1: | Generate network I |
| 2: | Define starting set A |
| 3: | Create dictionary Depth |
| 4: | function PROP(i, S) |
| 5: | $H \leftarrow I \backslash N_i \cup \{i\})$ |
| 6: | $p \leftarrow 0$ |
| 7: | $n \leftarrow |H|$ |
| 8: | for $j \in H$ do: |
| 9: | if $j \in S$ then: |
| 10: | $p \leftarrow p + 1$ |

-continued

| Algorithm 3 Pseudocode | |
|---|---|
| 11: | end if |
| 12: | end for |
| 13: | return p/n |
| 14: | end function |
| 15: | q ← 1 |
| 16: | b ← 0 |
| 17: | c ← 1 |
| 18: | while |A| < |I| do: |
| 19: | F ← Ø |
| 20: | B ← I\A |
| 21: | B' ← Ø |
| 22: | while B ≠ B' do: |
| 23: | for i in B do: |
| 24: | $p_i$ ← PROP(i, A) |
| 25: | if $s_i/w_i + \varphi_i(p_i)/w_i(b+c) \geq q$ then |
| 26: | F ← F ∪ {i} |
| 27: | end if |
| 28: | end for |
| 29: | A ← A ∪ F |
| 30: | B' ← B |
| 31: | B ← I\A |
| 32: | end while |
| 33: | if F =Ø then |
| 34: | if F = I then |
| 35: | Depth(q) ← 1 |
| 36: | return q |
| 37: | else |
| 38: | Depth(q) ← |S\I| |
| 39: | for i ∈ B do: |
| 40: | $p_i$ ← PROP(i, A) |
| 41: | end for |
| 42: | q ← $\max_{i \in B} (cs_i/cw_i - \varphi_i(p_i))$ |
| 43: | b ← (c(1−q))/q |
| 44: | end if |
| 45: | end if |
| 46: | end while |

In some implementations, the interval [0, q*] gives a full characterization of when contagion occurs from S to the entire network. In other words, for a given starting set S, the most resilient network that can be fully infected is the one with the relative cost of miscoordination given by q*. Networks with resilience less than or equal to q* may be fully infected while those with higher resilience will not be fully infected. Algorithms 1 and Algorithm 2 provide computable solutions to the problem of determining when different conventions (in the sense that some players play 0 and others play 1) coexist in equilibrium. A subset E⊆I is an equilibrium at q if E is a Nash equilibrium at q, E≠Ø and E≠I.

In various implementations, the contagion management system 106 utilizes Algorithms 1 and 2 to find equilibria with coexisting conventions. For example, starting with any nonempty set S of players with an incentive to play 1 at q, the contagion management system 106 checks that the ending set in Algorithm 1 is not the full network, that is, C(S, q)≠I. Further, in addition to determining that the threshold q guarantees contagion to the entire network, the contagion management system 106 can utilize Algorithm 2 to determine how far contagion progresses if it does not proliferate to the entire network. This is helpful to understand the proliferation of contagion to a fraction of the network.

In addition, Algorithm 2 yields a decreasing sequence of thresholds $q_n$ and a corresponding increasing sequence of contagion sets c(S, q) that shows how far action 1 can spread at $q_n$. Combined with the fact that for each q∈ $(q_n, q_{n−1}]$, C(S, q)=C(S, $q_{n−1}$), the contagion management system 106 can define the contagion depth function from S as follows:

$$\delta(S, q) = \begin{cases} 1 & \text{if } q \leq q^* \text{ and} \\ \dfrac{|C(S, q_n)|}{|I|} & \text{if } q_{n+1}, < q \leq q_n, \text{ for } n \in \{0, \dots, N - 1\} \end{cases}$$

For a fixed starting set S, δ measures the proportion of the network that is infected as a function of network resilience parameter q∈ [0, 1]. For a fixed S, it is a step function that starts at 1 for q≤q* (low network resilience leads to full contagion) and strictly decreases in a step-wise manner to /C(S, $q_n$)/| |I| over each interval ($q_{n+1}$, $q_n$] as network resilience increases. The contagion depth function is an equilibrium notion. Accordingly, for each S and q, it provides the fraction of the network infected by the smallest Nash equilibrium that includes S. Additionally, in some implementations, the contagion depth function allows the contagion management system 106 to analyze scenarios in which one or more actions may spread to a significant proportion of a network but not the entire network.

Figure 7A:
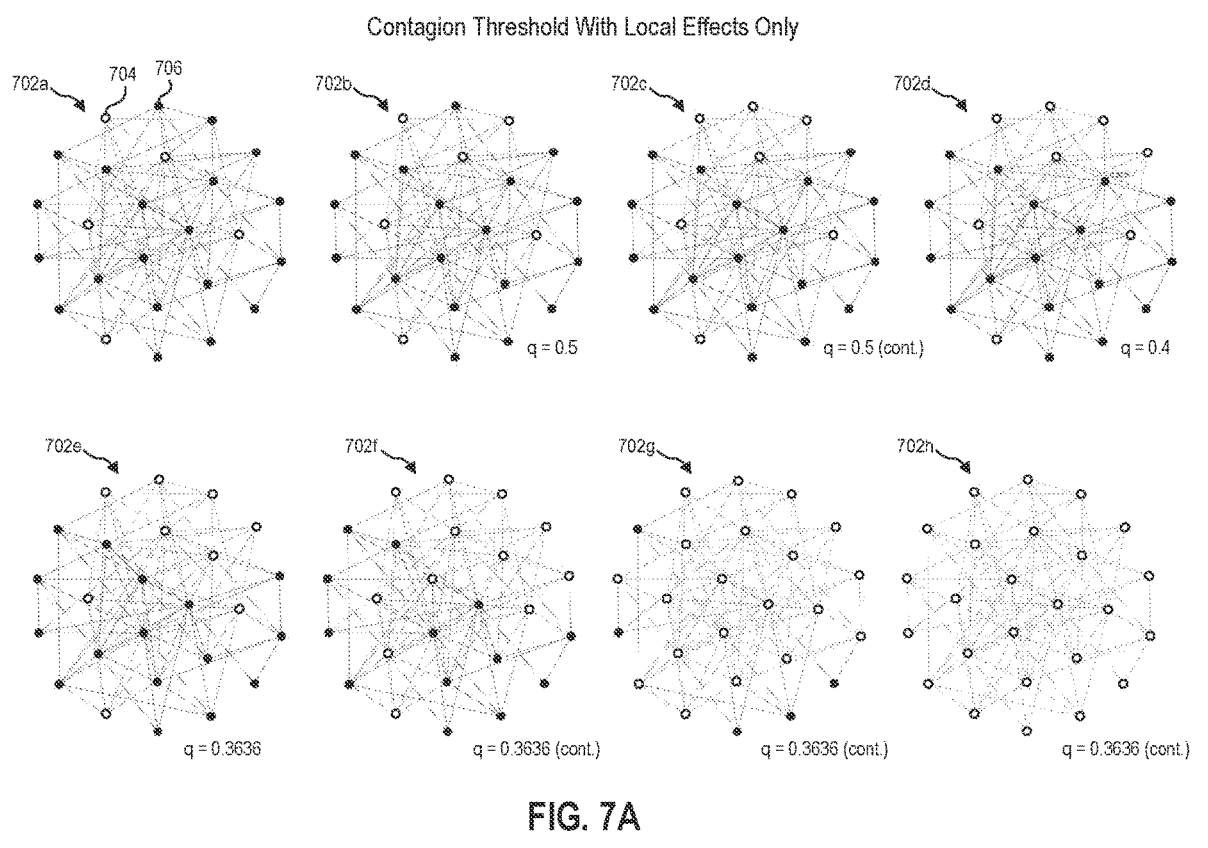

The following visual example shows an example illustration of the contagion management system 106 utilizing Algorithm 1 and Algorithm 2. To illustrate, FIGS. 7A-7B illustrate examples of a contagion spreading in a network over time based on local and global effects in accordance with one or more implementations. In particular, FIGS. 7A-7B include versions of the same network 720a-702h that includes 25 nodes (e.g., I=5) and an attachment parameter of 5 (e.g., m=5). As shown, the nodes can include infected nodes 704 (e.g., the node has or is associated with a target characteristic) or non-infected nodes 706.

In various implementations, the contagion management system 106 models the global effect by $\varphi_i(p_i)=\alpha cd_ip_i$, where the cost of miscoordination is normalized to c=1. As shown, α=0 corresponds to the contagion management system 106 omitting in a global network effect (i.e., a global effect factor), α=1 corresponds to the contagion management system 106 applying the global effect, and intermediate values of α (e.g., 0<α<1) correspond to intermediate values of the global effect factor and its impact on payoffs. As shown, FIG. 7A displays an example of α=0 and FIG. 7B shows an example of α=1.

Both FIGS. 7A-7B begin with the same first version of the network 702a, 712a. As shown in the first version of the network 702a, 712a, 5 players (i.e., nodes) are playing 1 (e.g., infected nodes 704). For example, these 5 nodes have been exogenously infected to play 1. These nodes make up the initial starting set S, identified by the outlined nodes.

In FIG. 7A, the contagion management system 106 utilizes Algorithm 2 with $q_0$=1 (e.g., the network resistance parameter set to full network resistance) and check the remaining 20 players. As shown in the first version of the network 702a, the contagion management system 106 does not find any other player that becomes infected at step 1 (i.e., $A_1$=$A_0$=S).

Accordingly, the contagion management system 106 utilizes Algorithm 2 to determine the next lowest network resistance parameter at which at least one node will switch (e.g., become infected), represented as $q_1$=0.5. For convivence, each version of the network includes the current label network resistance parameter (i.e., q) corresponding with the network version.

Running Algorithm 1 with ($A_1$, $q_1$) shows that in the first iteration (with 20 players remaining) only 1 player switches at step 1 of Algorithm 1. This is shown in the second version of the network 702b, leaving 19 non-infected players. Additionally, in the second iteration of running Algorithm 1, 1 more player flips as shown in the third version of the network 702c, leaving 18 non-infected players. At this point, Algorithm 1 shows that no additional nodes will become infected given the network resistance parameter of $q_1$=0.5. Thus, at q=0.5, the contagion spreads to 7 players, which is the smallest Nash equilibrium of players playing 1 if we start from (S, $q_1$).

Continuing forward, the contagion management system 106 runs Algorithm 2, in light of the updated current set $A_2$, to determine the next level for q that would cause one of the remaining 18 players to switch. For example, the contagion management system 106 utilizes Algorithm 2 to determine $q_2$=0.4. Then, the contagion management system 106 runs Algorithm 1 with ($A_2$, $q_2$) to show that 1 player becomes infected leaving 17 non-infected players, as shown in the fourth version of the network 702d. Algorithm 1 yields no additional infections at $q_2$.

The above process is repeated. For example, the contagion management system 106 runs Algorithm 2 with the updated set of 8 players as $A_3$ to determine that the next largest network resistance parameter is $q_3$=0.3636. As shown in the fifth version of the network 702e, utilizing ($A_3$, $q_3$) as input to Algorithm 1 results in 1 more player flipping in the first iteration, leaving 16 non-infected players. In the second iteration, 3 more players flip leaving 13 non-infected players, as shown in the sixth version of the network 702f. In the third iteration of Algorithm 1 at ($A_3$, $q_3$), 3 more players flip, leaving 13 non-infected players, as shown in the seventh version of the network 702g. In the fourth iteration, the remaining 5 players flip, as shown in the eighth version of the network 702h.

In some implementations, Algorithm 2 also yields the depth of contagion for different values of q. Depth (in terms of proportion of the network infected) is 1 when q≤0.3636, is 7/25 when q∈(0.3636, 0.4], is 6/25 when q∈(0.4, 0.5], and is 5/25 when q∈(0.5, 1]. In addition, as shown, the contagion management system 106 determines a full network contagion over 8 periods and/or subsets of players in the complement of S, as compared to the total number of subsets of players in the complement of S, which is $2^{20}$=1,048,576.

Turning to FIG. 7B, the contagion management system 106 shows the example of network spreading with global effects (i.e., α=1). As noted above, the first version of the network 712a in FIG. 7B is the same as the first version of the network 702a in FIG. 7A. Indeed, the contagion management system 106 starts with the same initial starting set of 5 players in S and $q_0$=1. Again, the contagion management system 106 determines that no other player will become infected at ($A_1$, The contagion management system 106 utilizes Algorithm 2 to determine $q_1$=0.563, which is the next largest network resistance parameter at which the next marginal player will flip. As shown in the second version of the network 712b, 1 player flips at $q_1$=0.563 leaving 19 non-infected players. As a note, this is the same player as in the earlier case, but the threshold at which this player flips is higher due to the impact of global effect, which contributes 0.063 to the network resistance (e.g., $q_1$=0.563 at α=1 compared to $q_1$=0.5 at α=0).

The contagion management system 106 again utilizes Algorithm 2 with the updated set to determine the next largest network resistance parameter. As shown in the third version of the network 712c, 1 more player flips at $q_2$=0.543 in the first iteration of running Algorithm 1 at ($A_2$, $q_2$), leaving 18 non-infected players. In the second iteration, 1 more player flips leaving 17 non-infected players, as shown in the fourth version of the network 712d. In the third iteration, 2 more players flip leaving 15 non-infected players, as shown in the fifth version of the network 712e. In the fourth iteration of running Algorithm 1 at ($A_2$, $q_2$), 13 more players flip leaving 2 non-infected players, as shown in the sixth version of the network 712f. In the fifth iteration, the last 2 players flip, as shown in the seventh version of the network 712g.

As shown in FIG. 7B, the contagion management system 106 determines that the contagion threshold with global effects for starting set S is q*=0.543. Depth (in terms of proportion of the network infected) is 1 when q≤0.543, is 6/25 when q∈(0.543, 0.563], and is 5/25 when q∈(0.563, 1]. In addition, as shown, the contagion management system 106 determines a full network contagion over 7 periods, which is fewer than without global effects. Indeed, the contagion threshold of the network resistance parameter on the network with global effects is considerably higher than with local effects only. In other words, for every q∈(0.3636, 0.543] there is full contagion with global effects but not without it. More generally, for every q E [0, 1], the depth of contagion at q is (weakly) higher with global effects than without.

Monte Carlo Simulation

As provided above, the contagion management system 106 provides various models (e.g., the spreading model and/or the full-network spreading model) that offer computationally feasible tools to determine equilibrium properties of contagion in networks. To further show the results of the models, the contagion management system 106 is used in connection with a Monte Carlo simulation of scale-free networks. For context, scale-free networks capture the idea of preferential attachment. In particular, researchers evaluated the contagion management system 106 with a Monte Carlo simulation under a large number of network configurations combinations, attachment parameters, starting set sizes S, local network effects, and global network effects.

As mentioned above, in some implementations, global network effects can be represented by $\varphi_i(p_i)=\alpha cd_i p_i$, where $cd_i$ is the upper bound on pi, the term c is a constant set to 1, and the global virality parameter α indexes the impact of global network effects. For setup, researchers utilized the following conditions:

1. Fix a global virality parameter α∈{0, 0.5, 1}.
2. Fix an attachment parameter m∈{5, 10, 20} and randomly generate 40 scale-free networks of size 1,000 with attachment parameter m.
3. In each generated network, for each starting set size n∈{10|λ=1, . . . , 99}, randomly select 50 sets S of nodes in the generated network, each set of size |S|=n. Players in S are assumed to have an incentive to play 1 at q=1. In some instances, these players are exogenously infected to play 1.
4. For each S, use the combined algorithm to compute the contagion threshold q* and the depth of contagion function δ(S, q).
5. Repeat for each α and m.

For each m and α, the above setup generates 198,000 (i.e., 40×50×99) complete runs of Algorithm 3. Varying m∈{5, 10, 20} and α∈{0, 0.5, 1} yields 1,782,000 complete runs of Algorithm 3 (i.e., 9 scenarios, each with 198,000 runs). The results based on these simulations are provided below.

The parameter values facilitate analysis for three levels, intuitively corresponding to low, medium, and high parameter values. For the attachment parameter m, the value m=5 captures the idea of low attachment (e.g., 5 connections as each new player is added to form a network with 1,000 players), m=10 is medium attachment (e.g., 10 connections for each new player), and m=20 is high attachment (e.g., 20 connections for each new player).

The global effect value α=0 corresponds to the model with local effects only, α=1 is the model with local and global effects, and α=0.5 indexes an intermediate level of global effects. Similarly, q=0.25 is considered to be the low relative cost of miscoordination (or low network resilience to switch to 1), q=0.5 is considered to be the medium relative cost of miscoordination (or medium network resilience), and q=0.75 is considered to be the high relative cost of miscoordination (or high network resilience).

Figure 8:
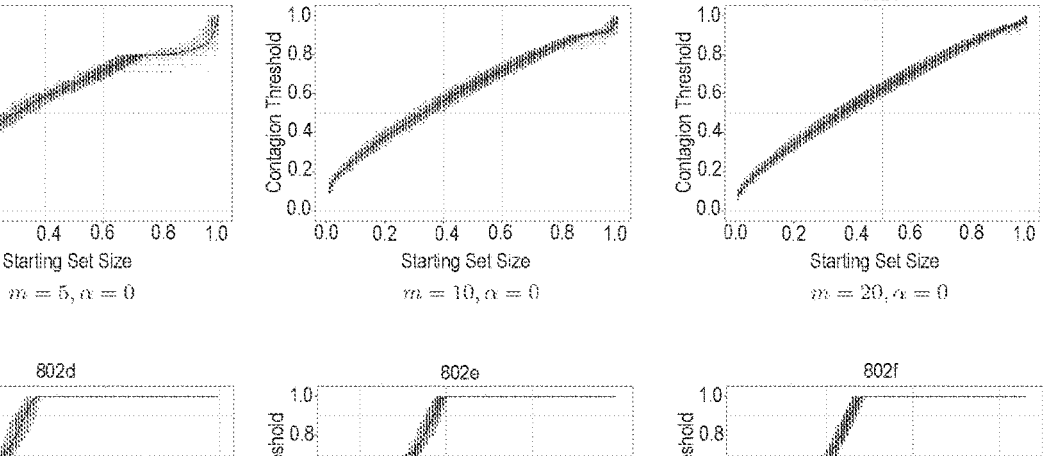
FIG. 8 illustrates examples of contagion thresholds for scale-free networks in accordance with one or more implementations.

Regarding contagion thresholds and/or network resistance parameters, FIG. 8 shows a distribution of contagion thresholds (q*) for six of the nine scenarios. For example, FIG. 8 shows six graphs charting contagion threshold (y-axis) over starting set size (x-axis) as a proportion of the network and compares different combinations of attachment parameters (i.e., m) and global effect values (i.e., a). The results where α=0.5 have been omitted from FIG. 8 for simplicity. In addition, a summary of selected data is included in Table 1.

To illustrate, each of the graphs 802a-802f in FIG. 8 shows the starting set size. Each dot represents one run of the algorithm for the corresponding starting set to determine contagion threshold q*. For each starting set size, there are 2,000 outcomes and there are 99 starting set sizes to yield a total of 198,000 outcomes in each panel. The bold line plots the average contagion threshold for the 2,000 outcomes for each starting set size. Graphically, the area under the curve signifies starting sets for which contagion occurs from S to the entire network (q≤q*) and the area above the curve signifies starting sets for which contagion does not occur from S to the entire network (q>q*).

Several features of contagion on networks emerge in FIG. 8. In each case, the average contagion threshold increases based on starting set size (e.g., the area under the curve increases as the contagion management system 106 moves toward higher starting set sizes) signifying a greater range of q for which contagion occurs from S to the entire network. Also, as shown, the contagion thresholds are mostly distributed tightly around the average.

As shown, as the contagion management system 106 increases global impact (e.g., an increase in α, or moving downward in a column), the contagion threshold increases, making the network more susceptible to contagion. Indeed, the same increase in starting set size causes a larger increase in the contagion threshold when the global impact is higher, in the higher slope of the average contagion threshold line when a goes up. Additionally, this shows a complementarity in the effect of starting set size and global effects on contagion thresholds. Namely, a greater starting set size results in a greater impact of global effects in raising the contagion threshold.

To further illustrate, in a low connectivity network (m=5) with no global effects (α=0) such as the first graph 802a, when starting set size increases from 5 percent (50 players) to 10 percent, the contagion threshold q* increases by 36.3 percent (from 0.226 to 0.308). But with global effects (α=1) such as the fourth graph 802d, the comparable increase is 48.6 percent (from 0.253 to 0.376). An increase of starting set size from 5 percent to 20 percent leads to a 79.2 percent increase in the contagion threshold (from 0.226 to 0.405) without global effects, but a 125.7 percent (from 0.253 to 0.571) with global effects, on average. Thus, a snowball effect of contagion results from increasing returns and a marginal increase in the starting set size causes a more than proportional increase in the contagion threshold in the presence of global effects.

Indeed, after a point, the impact of global effects overrides local obstacles to switch to 1. In low or moderate connectivity networks (m=5, 10) with global effects (α=1), the contagion threshold is q*=1 with a starting set size of 40 percent (see Table 1 below). In other words, in low or moderate connectivity networks with global effects, if about 40 percent of the network is infected (has an incentive to play 1 at q=1), there is little likelihood of stopping contagion spreading to the entire network. That is, even if for every remaining player, the cost of miscoordination with a neighbor (c>0) is unboundedly higher than the benefit of coordination (b is arbitrarily close to 0). But the impact of global effects (α=0) can be stopped or reduced, a contagion that reaches 40 percent of the network will not spread to the whole network whenever relative miscoordination cost q is above 0.584, on average.

TABLE 1

Average Thresholds For Full Network Contagion For Different Starting Set Sizes

| | m = 5 | | | m = 10 | | | m = 20 | | |
|---|---|---|---|---|---|---|---|---|---|
| Size | α = 0 | α = 0.5 | α = 1 | α = 0 | α = 0.5 | α = 1 | α = 0 | α = 0.5 | α = 1 |
| 0.01 | 0.171 | 0.174 | 0.177 | 0.109 | 0.110 | 0.111 | 0.085 | 0.086 | 0.087 |
| 0.02 | 0.194 | 0.198 | 0.201 | 0.143 | 0.146 | 0.149 | 0.105 | 0.107 | 0.108 |
| 0.03 | 0.201 | 0.206 | 0.211 | 0.166 | 0.170 | 0.175 | 0.126 | 0.129 | 0.132 |
| 0.04 | 0.209 | 0.217 | 0.227 | 0.182 | 0.189 | 0.196 | 0.142 | 0.147 | 0.151 |
| 0.05 | 0.226 | 0.239 | 0.253 | 0.195 | 0.203 | 0.212 | 0.157 | 0.162 | 0.168 |
| 0.06 | 0.246 | 0.262 | 0.279 | 0.210 | 0.217 | 0.228 | 0.173 | 0.180 | 0.188 |
| 0.07 | 0.263 | 0.284 | 0.306 | 0.222 | 0.235 | 0.249 | 0.187 | 0.196 | 0.206 |
| 0.08 | 0.280 | 0.304 | 0.331 | 0.238 | 0.254 | 0.272 | 0.199 | 0.211 | 0.223 |
| 0.09 | 0.294 | 0.322 | 0.354 | 0.253 | 0.271 | 0.293 | 0.212 | 0.226 | 0.241 |
| 0.1 | 0.308 | 0.340 | 0.376 | 0.265 | 0.288 | 0.313 | 0.225 | 0.242 | 0.261 |
| 0.2 | 0.405 | 0.477 | 0.571 | 0.377 | 0.437 | 0.512 | 0.340 | 0.386 | 0.449 |
| 0.3 | 0.498 | 0.627 | 0.831 | 0.474 | 0.587 | 0.746 | 0.442 | 0.538 | 0.676 |
| 0.4 | 0.584 | 0.790 | 1 | 0.562 | 0.748 | 1 | 0.536 | 0.698 | 0.966 |
| 0.5 | 0.650 | 0.946 | 1 | 0.643 | 0.916 | 1 | 0.624 | 0.870 | 1 |
| 0.6 | 0.720 | 1 | 1 | 0.720 | 1 | 1 | 0.709 | 1 | 1 |
| 0.7 | 0.788 | 1 | 1 | 0.794 | 1 | 1 | 0.788 | 1 | 1 |
| 0.8 | 0.800 | 1 | 1 | 0.858 | 1 | 1 | 0.862 | 1 | 1 |
| 0.9 | 0.825 | 1 | 1 | 0.903 | 1 | 1 | 0.928 | 1 | 1 |

As shown in Table 1, increasing connectivity (e.g., an increase in m, or going across in a row through the graphs from the first graph 802a to the second graph 802b to the third graph 802c or from the fourth graph 802d to the fifth graph 802e to the sixth graph 802f) makes the average contagion threshold curve less steep making it harder to propagate an action across the network. Other things being equal, higher connectivity implies a higher degree, which lowers the incentive for a player to play 1, as shown by the threshold calculation $$\frac{s_i}{d_i} + \frac{\phi_i(p_i)}{d_i(b+c)} \geq q.$$

For example, suppose q=0.25 and consider a network with global effects (α=1). As shown in Table 1, for a starting set size of 5 percent, full contagion occurs with a low attachment parameter (m=5) but does not occur with a moderate or high attachment parameter (m=10, 20). Thus, when a node has few neighbors or when network connectivity settings are strengthened, limited, restricted, controlled, and/or modified, flipping the node is less likely and the opposite is true when a player has more neighbors.

Regarding the depth of contagion, as noted above, the depth of contagion function, $\delta(S, q)$, measures how far contagion spreads in equilibrium starting from the initial set S and the network resilience parameter $q=c/(b+c)\in[0, 1]$. To illustrate, FIG. 9A illustrates the depth of contagion for scale-free networks with an attachment parameter m=5. FIG. 9B illustrates the depth of contagion for scale-free networks with an attachment parameter m=20. For simplicity, visual results for the depth of contagion for scale-free networks with an attachment parameter m=10 have been omitted. Accordingly, FIG. 9A shows graphs 902a-902f and FIG. 9B shows graphs 912a-912f where each graph has different combinations of network resistance parameters (i.e., q) and global effect values (i.e., $\alpha$).

In each graph of FIGS. 9A-9B, the starting set size as a proportion of the network is on the horizontal x-axis and an equilibrium depth of contagion is on the vertical y-axis. In each graph, for each starting set size, there are 2,000 computations of the depth of contagion. Each dot represents one such computation. As the depth of contagion uses equilibrium sets of the form C(S, q), each dot corresponds to a Nash equilibrium in the corresponding network for starting set S at q. As $S\subseteq C(S, q)$, each dot is above the diagonal. The difference between $\delta(S, q)$ and the diagonal measures how far contagion spreads in equilibrium from a given initial set, formalizing an equilibrium notion of virality. Points on the diagonal show that there is no further contagion beyond the corresponding starting set size (S=C(S, q)). The average of these depths is overlaid as a line across different starting set sizes.

In each of the graphs, an increase in starting set size increases the depth of contagion. The result is due to greater node-to-node spread as well as a greater impact of global effects. In particular, in the absence of global effects, it is harder to spread contagion at a higher q. This can be seen by going across the top row of graphs in each figure (e.g., In FIG. 9A from the first graph 902a to the second graph 902b to the third graph 902c and in FIG. 9B from the first graph 912a to the second graph 912b to the third graph 912c).

More specifically, in FIG. 9A, when network resilience is low (q=0.25), the depth of contagion rises steeply in a narrow range of small starting set sizes (e.g., about 5-10 percent of the network) and spreads quickly to the entire network beyond that. When resilience increases to q=0.5, the contagion spreads more slowly for smaller starting set sizes, speeds up if about 20-25 percent of the network has an incentive to play 1 and spreads quickly to the entire network shortly thereafter. When resilience is high (q=0.75) indicating higher network resilience, there is almost no contagion beyond the starting set until about 35 percent of the network is infected, then the contagion spreads gradually in the range of 35-65 percent of the network before spreading to the entire network.

With the introduction of global effects, the contagion spreads deeper using smaller starting sets. This can be seen by comparing a graph in the top row to a corresponding graph in the bottom row in FIGS. 9A-9B. For instance, in FIG. 9A, without global effects ($\alpha=0$ shown in the top row), the starting set size needs to go beyond about 35 percent of the network for contagion to start spreading and it takes about 68 percent of the network to be affected before contagion spreads to the entire network. With $\alpha=0.5$ (not shown), the contagion spreads earlier, with starting set size around 25 percent and spreads to the entire network once about 40 percent of the network is affected. With global effects ($\alpha=1$ shown in the bottom row), the contagion starts even earlier, at around 20 percent of the network and spreads to the entire network once about 30 percent of the network is infected.

Turning to the graphs where global effects are applied (e.g., $\alpha=1$ in the bottom rows of FIGS. 9A-9B). When q=0.25 and m=5 (as shown in the fourth graph 902d of FIG. 9A), the interval is about 4-9 percent of the network. For q=0.25 and m=10 (not shown) m=10, the interval is about 6-11 percent of the network. For q=0.25 and m=20 (as shown in the fourth graph 912d of FIG. 9B), the interval is about 9-15 percent of the network.

When q=0.5, this interval increases and complementarity implies that global effects play a more visible role in shrinking this interval. For m=5, this interval is about 13-35 percent of the network without global effects ($\alpha=0$) (as shown in the second graph 902b of FIG. 9A) but 12-19 percent with global effects ($\alpha=1$) (as shown in the fifth graph 902e of FIG. 9A). For m=10, the interval is about 20-37 percent of the network with $\alpha=0$ (not shown) and shrinks to about 17-23 percent with $\alpha=1$ (not shown). For m=20, the interval is about 29-40 percent of the network with $\alpha=0$ (as shown in the second graph 912b of FIG. 9B) and falls to 20-26 percent with $\alpha=1$ (as shown in the fifth graph 912e of FIG. 9B).

When q=0.75, this interval increases even more with local effects only and global effects play an even stronger role in shrinking this range. For m=5, this interval is about 30-68 percent of the network with $\alpha=0$ (as shown in the third graph 902c of FIG. 9A) but 20-30 percent of the network with $\alpha=1$ (as shown in the sixth graph 902f of FIG. 9A). For m=10, this interval is about 47-69 percent of the network with $\alpha=0$ (not shown) but about 26-33 percent with $\alpha=1$ (not shown). For m=20, this interval is about 56-69 percent of the network with $\alpha=0$ (as shown in the third graph 912c of FIG. 9B) and 30-36 percent with $\alpha=1$ (as shown in the sixth graph 912f of FIG. 9B).

In most cases, global effects shrink the singularity interval to about 6-7 percentage point difference in starting set sizes. Below this, there is no contagion and beyond this contagion spreads to the entire network.

Inverse Depth Of Contagion

As noted above in connection with FIG. 6, in various implementations, the contagion management system 106 can utilize the spreading model and/or the full-network spreading model along with Algorithms 1-3. More specifically, the contagion management system 106 can determine an equilibrium contagion depth function $\delta(S, q)$ to determine the minimum starting set size needed to achieve a target depth of contagion. In some instances, because an average depth of contagion is a (weakly) increasing function based on a given starting set size, the contagion management system 106 can invert the function to numerically derive the (smallest) starting set size needed to achieve a target depth of contagion. As noted above, this process is sometimes referred to as an inverse depth of contagion of a network.

Table 2, below, provides a range of numbers for depths of a contagion ranging from 0.1 (10 percent of network) to 1.0 (100 percent of network) at steps of 0.1. As shown in Table 2, a broad pattern emerges showing that to spread a contagion to a target depth of the network (on average), smaller starting sets are needed when relative miscoordination cost is lower (e.g., q is low/network resilience is low), the global effect is higher (e.g., a is high/global effect is strong), network connectivity is lower (e.g., m is low), or a combination of these settings. As shown, different combinations of these parameters have differing impacts on the starting set size needed to achieve a given depth of contagion.

TABLE 2

| Starting Set Size Needed To Achieve A Given Depth Of Contagion | | | | | | | | | | |
|---|---|---|---|---|---|---|---|---|---|---|
| Depth | 0.1 | 0.2 | 0.3 | 0.4 | 0.5 | 0.6 | 0.7 | 0.8 | 0.9 | 1.0 |
| m = 5, q = 0.25 | | | | | | | | | | |
| $\alpha = 0$ | 0.05 | 0.05 | 0.05 | 0.06 | 0.06 | 0.06 | 0.07 | 0.07 | 0.07 | 0.09 |
| $\alpha = 0.5$ | 0.04 | 0.05 | 0.05 | 0.06 | 0.06 | 0.06 | 0.06 | 0.07 | 0.07 | 0.08 |
| $\alpha = 1$ | 0.04 | 0.05 | 0.05 | 0.05 | 0.05 | 0.06 | 0.06 | 0.06 | 0.06 | 0.08 |
| m = 5, q = 0.5 | | | | | | | | | | |
| $\alpha = 0$ | 0.10 | 0.18 | 0.23 | 0.26 | 0.27 | 0.28 | 0.28 | 0.29 | 0.30 | 0.35 |
| $\alpha = 0.5$ | 0.10 | 0.17 | 0.20 | 0.21 | 0.21 | 0.22 | 0.22 | 0.23 | 0.23 | 0.26 |
| $\alpha = 1$ | 0.10 | 0.15 | 0.16 | 0.16 | 0.16 | 0.17 | 0.17 | 0.17 | 0.17 | 0.19 |
| m = 5, q = 0.75 | | | | | | | | | | |
| $\alpha = 0$ | 0.10 | 0.20 | 0.30 | 0.38 | 0.46 | 0.53 | 0.59 | 0.62 | 0.64 | 0.68 |
| $\alpha = 0.5$ | 0.10 | 0.20 | 0.29 | 0.34 | 0.35 | 0.36 | 0.37 | 0.37 | 0.38 | 0.41 |
| $\alpha = 1$ | 0.10 | 0.20 | 0.25 | 0.26 | 0.27 | 0.27 | 0.28 | 0.28 | 0.29 | 0.31 |
| m = 10, q = 0.25 | | | | | | | | | | |
| $\alpha = 0$ | 0.07 | 0.08 | 0.08 | 0.08 | 0.09 | 0.09 | 0.09 | 0.09 | 0.10 | 0.11 |
| $\alpha = 0.5$ | 0.07 | 0.07 | 0.08 | 0.08 | 0.08 | 0.08 | 0.09 | 0.09 | 0.09 | 0.11 |
| $\alpha = 1$ | 0.06 | 0.07 | 0.07 | 0.07 | 0.07 | 0.08 | 0.08 | 0.08 | 0.08 | 0.10 |
| m = 10, q = 0.5 | | | | | | | | | | |
| $\alpha = 0$ | 0.10 | 0.20 | 0.27 | 0.29 | 0.31 | 0.31 | 0.32 | 0.32 | 0.33 | 0.37 |
| $\alpha = 0.5$ | 0.10 | 0.19 | 0.23 | 0.24 | 0.24 | 0.25 | 0.25 | 0.26 | 0.26 | 0.28 |
| $\alpha = 1$ | 0.10 | 0.18 | 0.19 | 0.19 | 0.19 | 0.20 | 0.20 | 0.20 | 0.21 | 0.23 |
| m = 10, q = 0.75 | | | | | | | | | | |
| $\alpha = 0$ | 0.10 | 0.20 | 0.30 | 0.40 | 0.49 | 0.57 | 0.61 | 0.63 | 0.64 | 0.69 |
| $\alpha = 0.5$ | 0.10 | 0.20 | 0.30 | 0.37 | 0.39 | 0.40 | 0.40 | 0.41 | 0.42 | 0.45 |
| $\alpha = 1$ | 0.10 | 0.20 | 0.28 | 0.30 | 0.30 | 0.31 | 0.31 | 0.31 | 0.31 | 0.33 |
| m = 20, q = 0.25 | | | | | | | | | | |
| $\alpha = 0$ | 0.09 | 0.11 | 0.11 | 0.12 | 0.12 | 0.12 | 0.12 | 0.13 | 0.13 | 0.15 |
| $\alpha = 0.5$ | 0.09 | 0.10 | 0.10 | 0.11 | 0.11 | 0.11 | 0.11 | 0.12 | 0.12 | 0.13 |
| $\alpha = 1$ | 0.08 | 0.09 | 0.09 | 0.10 | 0.10 | 0.10 | 0.10 | 0.10 | 0.11 | 0.12 |
| m = 20, q = 0.5 | | | | | | | | | | |
| $\alpha = 0$ | 0.10 | 0.20 | 0.29 | 0.34 | 0.35 | 0.35 | 0.36 | 0.36 | 0.37 | 0.40 |
| $\alpha = 0.5$ | 0.10 | 0.20 | 0.26 | 0.27 | 0.27 | 0.28 | 0.28 | 0.29 | 0.29 | 0.31 |
| $\alpha = 1$ | 0.10 | 0.20 | 0.22 | 0.22 | 0.23 | 0.23 | 0.23 | 0.23 | 0.24 | 0.25 |
| m = 20, q = 0.75 | | | | | | | | | | |
| $\alpha = 0$ | 0.10 | 0.20 | 0.30 | 0.40 | 0.50 | 0.59 | 0.63 | 0.65 | 0.66 | 0.69 |
| $\alpha = 0.5$ | 0.10 | 0.20 | 0.30 | 0.40 | 0.42 | 0.43 | 0.44 | 0.44 | 0.45 | 0.47 |
| $\alpha = 1$ | 0.10 | 0.20 | 0.30 | 0.32 | 0.33 | 0.33 | 0.33 | 0.34 | 0.34 | 0.36 |

As shown in Table 2, when m=5 and q=0.25, in order to spread contagion to one-half of the network (depth=0.5), a starting set size of 6 percent (60 players) of the network is required with local effects only ($\alpha$=0) and 5 percent is required with global effects ($\alpha$=1). When q is low, the node-to-node spread is high and the global effect has a small additional impact.

This can be explained by examining the incentive to play 1, given by $$\frac{s_i}{d_i} \geq q(1 - \alpha p_i),$$

where the partial derivative of the right-hand side with respect to $\alpha$ is $-qp_i$, which is a small absolute value when q is low. Additionally, when q is low, an increase in $\alpha$ has a smaller contribution to lowering the threshold to play 1.

When m=5 and q=0.5, in order to spread contagion to one-half of the network on average, a starting set size of 27 percent of the network is required if $\alpha$=0 and 16 percent if $\alpha$=1. That is, instead of needing 270 players in the initial starting set, including a global impact enables the same expected depth to be achieved with 160 players. This is a 40.7 percent reduction in the required starting set size. For full contagion, a 35 percent starting set size is needed when $\alpha$=0 and a 19 percent starting set size is needed when $\alpha$=1, implying that global impact yields a 45.7 percent reduction in starting set size.

When m=5 and q=0.75, full contagion requires 68 percent of the network with $\alpha$=0 and only 31 percent when $\alpha$=1. This is a 54.4 percent reduction in the required starting set size. As a result, the network goes from needing more than ⅔ of the network in the starting set when $\alpha$=0 to requiring less than ⅓ when $\alpha$=1.

The differential impact of global effects is especially pronounced when q increases from 0.5 to 0.75. Without global effect ($\alpha$=0), the required starting set increases from 35 percent of the network to 68 percent (a 94.3 percent increase), whereas with global effect ($\alpha$=1), the starting set size increases from 19 percent to 31 percent (a 63.2 percent increase). This can also be explained in terms of the threshold to play 1:

$$\frac{s_i}{d_i} \geq q(1 - \alpha p_i),$$

where the partial derivative of the right-hand side with respect to $\alpha$ is $-qp_i$, which is a large absolute value when q is high. Thus, when q is high, an increase in a has a larger contribution to lowering the threshold to play 1.

Accordingly, as shown in Table 2, the implication is that to achieve a target depth of contagion, adding and/or increasing global effects can have the largest impact when larger starting sets are present. In particular, this holds when the network is more resilient to contagion (e.g., q is high). In these cases, the global effects can have an outsized impact in reducing the required starting set size to achieve a given depth of contagion.

Example Processes And Components

Figure 10:
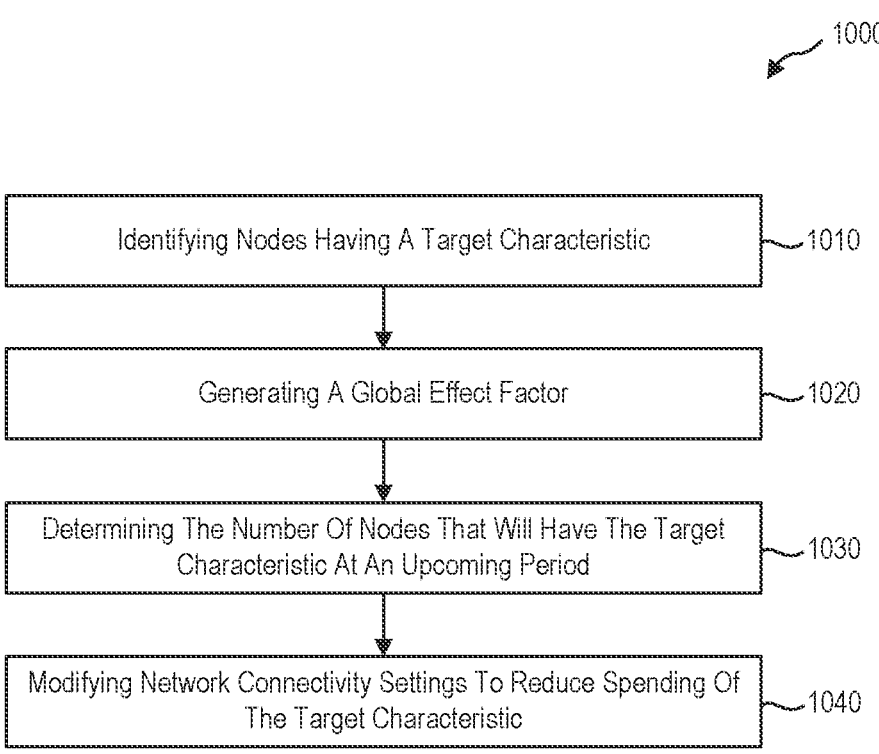
FIG. 10 illustrates an example series of acts for modifying network connectivity settings to manage contagion spread in a network in accordance with one or more implementations.

Turning now to FIG. 10, this figure illustrates an example flowchart that includes a series of acts for modifying network connectivity settings to manage contagion spread in a network in accordance with one or more implementations. While FIG. 10 illustrates acts according to one or more embodiments, alternative embodiments may omit, add to, reorder, and/or modify any of the acts shown. The acts of FIG. 10 can be performed as part of a method. Alternatively, a non-transitory computer-readable medium can include instructions that, when executed by one or more processors, cause a computing device to perform the acts of FIG. 10. In still further embodiments, a system can perform the acts of FIG. 10.

As shown in FIG. 10, the series of acts 1000 includes an act 1010 of identifying nodes having a target characteristic. For instance, the act 1010 can involve identifying a first number of nodes having a target characteristic in a network, the network including a plurality of nodes. In one or more implementations, the act 1010 includes analyzing the plurality of nodes to identify a subset of nodes that include the target characteristic. In some implementations, the plurality of nodes includes each node in the network connected to one or more other nodes of the plurality of nodes. In various implementations, the network includes a social networking system.

As further shown, the series of acts 1000 includes an act 1020 of generating a global effect factor. For instance, the act 1020 can involve generating a global effect factor based on the target characteristic and the network. In some implementations, the act 1020 includes generating the global effect factor for a node (e.g., each node) in the network that does not have the target characteristic. In example implementations, the global effect factor indicates a probability or likelihood that a given node in the network not having the target characteristic will have the target characteristic in a next period based on other non-directly connected nodes in the network. In one or more implementations, the global effect factor indicates a spreading factor of a node having the target characteristic affecting one or more other non-directly connected nodes to obtain the target characteristic in a next period. In various implementations, the global effect factor for a given node includes a fraction of nodes in the network that have the target characteristic (excluding the given node and neighbors of the given node).

As shown, the series of acts 1000 includes an act 1030 of determining the number of nodes that will have the target characteristic at an upcoming period. For instance, the act 1030 can involve determining that a second number of nodes in the network will have the target characteristic at an upcoming period based on the first number of nodes having the target characteristic, a network resistance parameter for the network, and the global effect factor. In one or more implementations, the network resistance parameter for the network is based on the one or more network connectivity settings. In some implementations, the second number of nodes includes a network spreading depth. In certain implementations, the network threshold includes all of the plurality of nodes in the network.

In various implementations, the act 1030 of determining that the second number of nodes in the network will have the target characteristic at the upcoming period is based on a depth spreading model and/or a full-network spreading model. In some implementations, the depth spreading model determines an amount of network spreading based on the first number of nodes that have the target characteristic and a given network resistance parameter. In example implementations, the full-network spreading model determines a target network resistance parameter needed to spread the target characteristic to all of the plurality of nodes based on the first number of nodes that have the target characteristic and the global effect factor for the target characteristic As further shown, the series of acts 1000 includes an act 1040 of modifying network connectivity settings to reduce spreading of the target characteristic. For instance, the act 1040 can involve modifying one or more network connectivity settings to reduce the total number of nodes in the network from having the target characteristic by the upcoming period based on the second number of nodes satisfying a network threshold at the upcoming period.

In some implementations, the network threshold includes a percentage of nodes in the network. In one or more implementations, the act 1040 includes reducing cross-global communications between non-neighbor nodes in the network. In various implementations, the act 1040 includes modifying the one or more network connectivity settings includes increasing network resilience based on limiting a number of nodes having, sharing, accessing, or posting the target characteristic. In certain implementations, the act 1040 includes increasing network resilience based on appending a verification notification to the target characteristic.

In example implementations, the series of acts 1000 includes additional acts. For example, in one or more implementations, the series of acts 1000 includes generating an attachment parameter for the network by determining an average number of connections between each node of the plurality of nodes and other nodes in the network and determining that the second number of nodes in the network will have the target characteristic at the upcoming period utilizing the attachment parameter. In various implementations, the series of acts 1000 includes causing a third number of nodes to have a characteristic opposite to the target characteristic. In some instances, the third number of nodes is larger than the second number of nodes.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., memory), and executes those instructions, thereby performing one or more processes, including one or more of the processes described herein.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmission media can include a network and/or data links that can be used to carry needed program code means in the form of computer-executable instructions or data structures and which can be accessed by a general-purpose or special-purpose computer. Combinations of the above should also be included within the scope of computer-readable media.

In addition, the network described herein may represent a network or collection of networks (such as the Internet, a corporate intranet, a virtual private network (VPN), a local area network (LAN), a wireless local area network (WLAN), a cellular network, a wide area network (WAN), a metropolitan area network (MAN), or a combination of two or more such networks) over which one or more computing devices may access the contagion management system 106. Indeed, the networks described herein may include one or multiple networks that use one or more communication platforms or technologies for transmitting data. For example, a network may include the Internet or other data link that enables transporting electronic data between respective client devices and components (e.g., server devices and/or virtual machines thereon) of the cloud computing system.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (NIC), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed by a processor, cause a general-purpose computer, special purpose computer, or special purpose processing device to perform a certain function or group of functions. In some embodiments, computer-executable instructions are executed by a general-purpose computer to turn the general-purpose computer into a special-purpose computer implementing elements of the disclosure. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Figure 11:
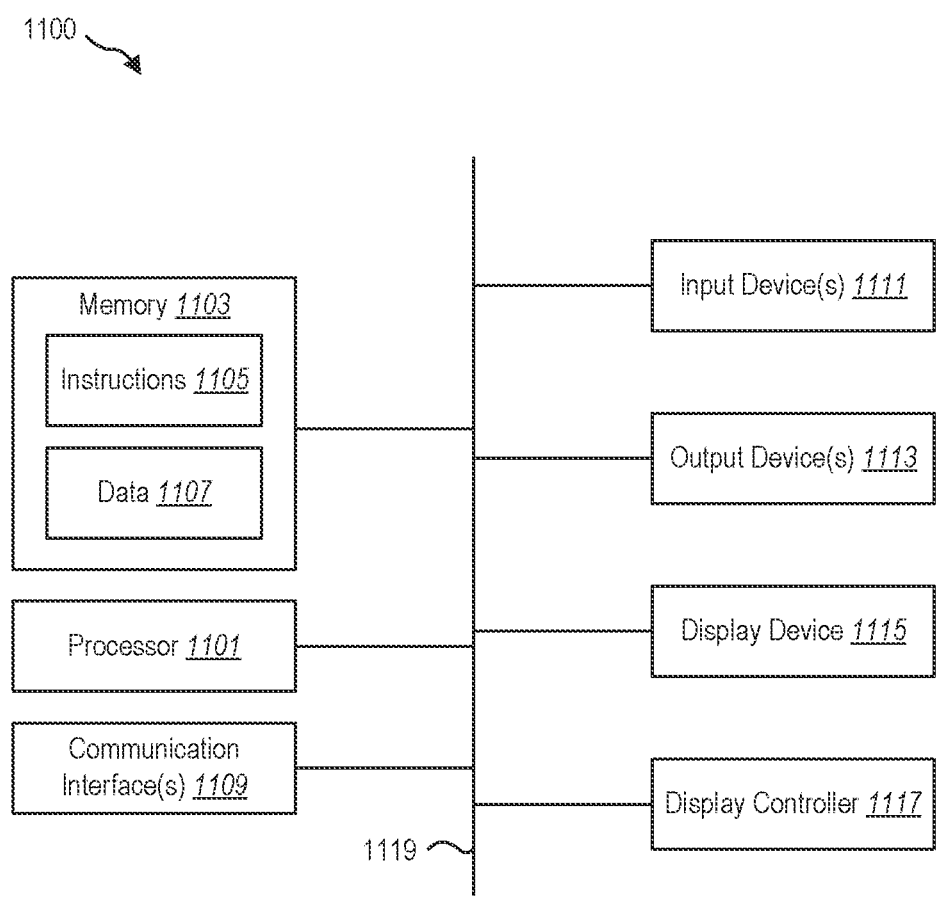
FIG. 11 illustrates certain components that may be included within a computer system.

FIG. 11 illustrates certain components that may be included within a computer system 1100. The computer system 1100 may be used to implement the various devices, components, and systems described herein.

In various implementations, the computer system 1100 may represent one or more of the client devices, server devices, or other computing devices described above. For example, the computer system 1100 may refer to various types of client devices capable of accessing data on a cloud computing system. For instance, a client device may refer to a mobile device such as a mobile telephone, a smartphone, a personal digital assistant (PDA), a tablet, a laptop, or a wearable computing device (e.g., a headset or smartwatch). A client device may also refer to a non-mobile device such as a desktop computer, a server node (e.g., from another cloud computing system), or another non-portable device.

The computer system 1100 includes a processor 1101. The processor 1101 may be a general-purpose single- or multi-chip microprocessor (e.g., an Advanced RISC (Reduced Instruction Set Computer) Machine (ARM)), a special purpose microprocessor (e.g., a digital signal processor (DSP)), a microcontroller, a programmable gate array, etc. The processor 1101 may be referred to as a central processing unit (CPU). Although the processor 1101 shown is just a single processor is shown in the computer system 1100 of FIG. 11, in an alternative configuration, a combination of processors (e.g., an ARM and DSP) could be used.

The computer system 1100 also includes memory 1103 in electronic communication with the processor 1101. The memory 1103 may be any electronic component capable of storing electronic information. For example, the memory 1103 may be embodied as random-access memory (RAM), read-only memory (ROM), magnetic disk storage media, optical storage media, flash memory devices in RAM, on-board memory included with the processor, erasable programmable read-only memory (EPROM), electrically erasable programmable read-only memory (EEPROM) memory, registers, and so forth, including combinations thereof.

Instructions 1105 and data 1107 may be stored in the memory 1103. The instructions 1105 may be executable by the processor 1101 to implement some or all of the functionality disclosed herein. Executing the instructions 1105 may involve the use of the data 1107 that is stored in the memory 1103. Any of the various examples of modules and components described herein may be implemented, partially or wholly, as instructions 1105 stored in memory 1103 and executed by the processor 1101. Any of the various examples of data described herein may be among the data 1107 that is stored in memory 1103 and used during execution of the instructions 1105 by the processor 1101.

A computer system 1100 may also include one or more communication interface(s) 1109 for communicating with other electronic devices. The one or more communication interface(s) 1109 may be based on wired communication technology, wireless communication technology, or both. Some examples of the one or more communication interface(s) 1109 include a Universal Serial Bus (USB), an Ethernet adapter, a wireless adapter that operates in accordance with an Institute of Electrical and Electronics Engineers (IEEE) 1102.11 wireless communication protocol, a Bluetooth® wireless communication adapter, and an infrared (IR) communication port.

A computer system 1100 may also include one or more input device(s) 1111 and one or more output device(s) 1113. Some examples of the one or more input device(s) 1111 include a keyboard, mouse, microphone, remote control device, button, joystick, trackball, touchpad, and light pen. Some examples of the one or more output device(s) 1113 include a speaker and a printer. a specific type of output device that is typically included in a computer system 1100 is a display device 1115. The display device 1115 used with embodiments disclosed herein may utilize any suitable image projection technology, such as liquid crystal display (LCD), light-emitting diode (LED), gas plasma, electroluminescence, or the like. A display controller 1117 may also be provided, for converting data 1107 stored in the memory 1103 into text, graphics, and/or moving images (as appropriate) shown on the display device 1115.

The various components of the computer system 1100 may be coupled together by one or more buses, which may include a power bus, a control signal bus, a status signal bus, a data bus, etc. For the sake of clarity, the various buses are illustrated in FIG. 11 as a bus system 1119.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

The techniques described herein may be implemented in hardware, software, firmware, or any combination thereof unless specifically described as being implemented in a specific manner. Any features described as modules, components, or the like may also be implemented together in an integrated logic device or separately as discrete but interoperable logic devices. If implemented in software, the techniques may be realized at least in part by a non-transitory processor-readable storage medium comprising instructions that, when executed by at least one processor, perform one or more of the methods described herein. The instructions may be organized into routines, programs, objects, components, data structures, etc., which may perform particular tasks and/or implement particular data types, and which may be combined or distributed as desired in various embodiments.

Computer-readable media can be any available media that can be accessed by a general-purpose or special-purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

As used herein, non-transitory computer-readable storage media (devices) may include RAM, ROM, EEPROM, CD-ROM, solid-state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general-purpose or special-purpose computer.

The steps and/or actions of the methods described herein may be interchanged with one another without departing from the scope of the claims. In other words, unless a specific order of steps or actions is required for proper operation of the method that is being described, the order and/or use of specific steps and/or actions may be modified without departing from the scope of the claims.

The term "determining" encompasses a wide variety of actions and, therefore, "determining" can include calculating, computing, processing, deriving, investigating, looking up (e.g., looking up in a table, a database, or another data structure), ascertaining and the like. Also, "determining" can include receiving (e.g., receiving information), accessing (e.g., accessing data in a memory), and the like. Also, "determining" can include resolving, selecting, choosing, establishing, and the like.

The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. For example, any element or feature described in relation to an embodiment herein may be combinable with any element or feature of any other embodiment described herein, where compatible.

The present disclosure may be embodied in other specific forms without departing from its spirit or characteristics. The described embodiments are to be considered illustrative and not restrictive. The scope of the disclosure is, therefore, indicated by the appended claims rather than by the foregoing description. Changes that come within the meaning and range of equivalency of the claims are to be embraced within their scope.

What is claimed is:

1. A computer-implemented method comprising:

identifying a first number of nodes having a target characteristic in a network, the network comprising a plurality of nodes;

generating a global effect factor based on the target characteristic and the network;

determining that a second number of nodes in the network will have the target characteristic at an upcoming period based on the first number of nodes, a network resistance parameter, and the global effect factor; and based on the second number of nodes satisfying a network threshold at the upcoming period, modifying one or more network connectivity settings by limiting communications from the first number of nodes with the target characteristic to cause a reduction to the second number of nodes in the network that will have the target characteristic in the upcoming period.

2. The computer-implemented method of claim 1, wherein the global effect factor indicates a probability that a node in the network not having the target characteristic will have the target characteristic in a next period based on influences of non-directly connected nodes indirectly connected via the network to the node.

3. The computer-implemented method of claim 1, wherein modifying the one or more network connectivity settings includes limiting a number of nodes that include the target characteristic to a predetermined number or network percentage for an allotted time.

4. The computer-implemented method of claim 1, wherein:
  generating the global effect factor comprises generating the global effect factor for a given node in the network that does not have the target characteristic; and
  generating the global effect factor comprises generating the global effect factor for a given node in the network that has the target characteristic.

5. The computer-implemented method of claim 1, wherein modifying the one or more network connectivity settings includes appending a verification notification to the target characteristic indicating a negative attribute of the target characteristic.

6. The computer-implemented method of claim 1, wherein determining that the second number of nodes in the network will have the target characteristic at the upcoming period is based on a depth spreading model and a full-network spreading model.

7. The computer-implemented method of claim 1, wherein the network threshold comprises a percentage of nodes in the network that, if satisfied, will cause the target characteristic to spread to throughout the network entirely.

8. The computer-implemented method of claim 1, wherein modifying the one or more network connectivity settings comprises reducing cross-global communications between non-neighbor nodes in the network by reducing communications between nodes based on node proximity.

9. The computer-implemented method of claim 8, wherein reducing cross-global communications includes restricting communications for nodes with the target characteristic to a network connectivity amount that indicates a number of permitted communication hops between the nodes on non-connected nodes.

10. The computer-implemented method of claim 1, further comprising:
  generating an attachment parameter for the network by determining an average number of connections between each node of the plurality of nodes and other nodes in the network; and
  determining that the second number of nodes in the network will have the target characteristic at the upcoming period utilizing the attachment parameter.

11. A non-transitory computer-readable storage medium comprising instructions that, when executed by at least one processor, cause a computing device to:
  identify a first number of nodes having a target characteristic in a network, the network comprising a plurality of nodes;
  generate a global effect factor based on the target characteristic and the network;
  determine that a second number of nodes in the network will have the target characteristic at an upcoming period based on the first number of nodes, a network resistance parameter, and the global effect factor; and
  based on the second number of nodes satisfying a network threshold at the upcoming period, modifying one or more network connectivity settings by limiting communications from the first number of nodes with the target characteristic to cause a reduction to the second number of nodes in the network that will have the target characteristic in the upcoming period.

12. The non-transitory computer-readable storage medium of claim 11, wherein determining that the second number of nodes in the network will have the target characteristic at the upcoming period is based on a depth spreading model or a full-network spreading model.

13. The non-transitory computer-readable storage medium of claim 12, wherein the depth spreading model determines an amount of network spreading based on the first number of nodes that have the target characteristic and a given network resistance parameter.

14. The non-transitory computer-readable storage medium of claim 12, wherein the full-network spreading model determines a target network resistance parameter needed to spread the target characteristic to all of the plurality of nodes based on the first number of nodes that have the target characteristic and the global effect factor for the target characteristic.

15. The non-transitory computer-readable storage medium of claim 11, wherein the network resistance parameter is based on an architecture of the network.

16. The non-transitory computer-readable storage medium of claim 11, wherein:
  the plurality of nodes comprises each node in the network connected to one or more other nodes of the plurality of nodes; and
  the network comprises a social networking system.

17. A system comprising:
  at least one processor; and
  a non-transitory computer memory comprising instructions that, when executed by the at least one processor, cause the system to:
    identify a first number of nodes having a target characteristic in a network, the network comprising a plurality of nodes;
    generate a global effect factor based on the target characteristic and the network;
    determine that a second number of nodes in the network will have the target characteristic at an upcoming period based on the first number of nodes, a network resistance parameter, and the global effect factor; and
    based on the second number of nodes satisfying a network threshold at the upcoming period, modifying one or more network connectivity settings by limiting communications from the first number of nodes with the target characteristic to cause a reduction to the second number of nodes in the network that will have the target characteristic in the upcoming period.

18. The system of claim 17, wherein:
  the one or more network connectivity settings indicate which nodes in the network can communicate with corresponding distantly connected nodes;
  the second number of nodes comprises a network spreading depth; and
  the network threshold comprises all of the plurality of nodes in the network.

19. The system of claim 17, wherein modifying the one or more network connectivity settings comprises increasing network resilience based on appending a notification to the target characteristic.

20. The system of claim 17, further comprising instructions that, when executed by the at least one processor, cause the system to cause a third number of nodes to have a characteristic opposite to the target characteristic, wherein the third number of nodes is larger than the second number of nodes.

\* \* \* \* \*